(12) United States Patent
Marsch et al.

(10) Patent No.: US 8,359,228 B2
(45) Date of Patent: Jan. 22, 2013

(54) AGENT FEEDBACK TOOL

(75) Inventors: Fatima Marsch, Plano, TX (US);
Margot Bowen, Arlington, TX (US)

(73) Assignee: Accenture Global Services Limited, Dublin (IE)

( * ) Notice: Subject to any disclaimer, the term of this patent is extended or adjusted under 35 U.S.C. 154(b) by 498 days.

(21) Appl. No.: 12/617,278

(22) Filed: Nov. 12, 2009

(65) Prior Publication Data

US 2010/0121688 A1 May 13, 2010

Related U.S. Application Data

(60) Provisional application No. 61/113,969, filed on Nov. 12, 2008.

(51) Int. Cl.
*G06Q 10/00* (2012.01)
(52) U.S. Cl. ...................... 705/7.42; 705/7.11
(58) Field of Classification Search .............. 705/7.42, 705/7.11
See application file for complete search history.

(56) References Cited

U.S. PATENT DOCUMENTS

| | | | | |
|---|---|---|---|---|
| 6,032,184 | A * | 2/2000 | Cogger et al. | 709/223 |
| 6,377,944 | B1 * | 4/2002 | Busey et al. | 1/1 |
| 6,516,055 | B1 * | 2/2003 | Bedeski et al. | 379/32.01 |
| 6,754,874 | B1 * | 6/2004 | Richman | 715/205 |
| 2002/0080950 | A1 * | 6/2002 | Koko et al. | 379/265.06 |
| 2002/0103693 | A1 * | 8/2002 | Bayer et al. | 705/10 |
| 2002/0120494 | A1 * | 8/2002 | Altemuehle et al. | 705/11 |
| 2002/0133369 | A1 * | 9/2002 | Johnson | 705/1 |
| 2002/0156797 | A1 * | 10/2002 | Lee et al. | 707/200 |
| 2003/0018702 | A1 * | 1/2003 | Broughton et al. | 709/202 |
| 2005/0193333 | A1 * | 9/2005 | Ebert | 715/517 |
| 2006/0242189 | A1 * | 10/2006 | Leetaru et al. | 707/102 |

OTHER PUBLICATIONS

"Edify: Edify 8.0 multi-channel CRM platform enables businesses to automate, assist and analyze customer interaction; Edify applications optimize enterprise-based CRM." M2 PressWire (Apr. 18, 2002).*
"NICE Systems: NICE feedback improves the contact centre customer experience; NICE systems provides a customer—centric view for better service." M2 Presswire, (Dec. 1, 2003).*

* cited by examiner

*Primary Examiner* — Peter Choi
*Assistant Examiner* — Renae Feacher
(74) *Attorney, Agent, or Firm* — Brinks Hofer Gilson & Lione

(57) ABSTRACT

An agent feedback tool includes an agent feedback database and an agent feedback module. The agent feedback module may include a vendor identification program, an agent feedback settings program, an agent feedback program, an agent reporting program, an agent summary program, and an agent profile program. The agent feedback module communicates with the agent feedback database to store mapping records and details relating to agents, vendors, vendor-specific locations, and feedback for the agents. The agent feedback program is operative to autopopulate one or more fields shown in an agent feedback graphical user interface by referring to mapping records stored in the agent feedback database.

19 Claims, 13 Drawing Sheets

| ID 304 | Date 308 | Agent 310 | Submitter 312 | Status 314 | Action Date 316 | Action Taken 318 | Vendor 320 | Center 322 |
|---|---|---|---|---|---|---|---|---|
| 16926 | Edit 306 | | | | | | | |
| | 10/13/2008 | ap207s | totty | Pending | | | Convergys | Manila |

| Date Occurred 324 | Case # 326 | DSL/TN # 328 | Feedback Details 330 | Mgr Date 332 | Manager Details 334 | Review Date 336 | Review Response 338 | New DSL 340 | ISP 342 |
|---|---|---|---|---|---|---|---|---|---|
| 10/13/2008 | 17500123 | 2146764310 | Agent did not transfer customer to Billing immediately, spent 10 minutes trying to explain instead of transferring. | | | | | No | No-ISP |

| Feedback Type 344 | Customer Primary Issue 346 | Feedback Cause Group 348 | Feedback Cause Details 350 |
|---|---|---|---|
| Coaching Opportunity | Billing Issue | Communication Effectiveness | Agent failed to empathize with the customer |

AGENT FEEDBACK TOOL

RELATED APPLICATIONS

This application claims priority under 35 U.S.C. §119(e) to U.S. Provisional Pat. App. No. 61/113,969, filed Nov. 12, 2008, which is incorporated by reference herein in its entirety.

BACKGROUND OF THE INVENTION

1. Technical Field

This application relates to an agent feedback tool and, in particular, to an agent feedback tool comprising an agent feedback program operative to autopopulate one or more editable fields based on a provided agent identifier.

2. Related Art

Providing superb customer service is often a goal for many businesses. On the frontline of these customer-service businesses are agents, such as customer service representatives, salespersons, and technical support individuals. These agents typically communicate first with the customer when a customer contacts a customer-service oriented business for customer service. Hence, a customer-service oriented business has an interest in ensuring that the customer service provided by the agent is of the upmost quality.

Monitoring the customer service provided by agents is often a laborious and time-consuming endeavor. A customer may have any number of issues and an agent may not always provide the appropriate level of service to the customer for any number of reasons. There may be a lack of training, lack of experience, or any other number of issues. It is important to track the agent's performance, yet the varying level of customer service provided by the agent is not always monitored and a customer-service oriented business suffers as a result.

SUMMARY

The agent feedback tool assists in the management and review of agent feedback. In one implementation, the agent feedback tool includes an agent profile program, an agent feedback program, a vendor identification program, an agent feedback settings program, an agent reporting program, and an agent summary program. The agent feedback tool programs communicate with an agent feedback database for managing and displaying the agent feedback.

In one implementation, the agent feedback database includes an agent feedback mapping record that has an agent-specific vendor identification entry, an agent-specific location identification entry, an agent identification entry, and an agent-specific agent feedback entry. The agent-specific vendor identification entry stores an agent-specific vendor identifier and the agent-specific location identification entry stores an agent-specific location identifier. The agent identification entry stores an agent identifier and the agent-specific agent feedback entry stores an agent feedback identifier. The agent-specific vendor identifier, the agent-specific location identifier, and the agent feedback identifier may be specific for the agent identified by the agent identifier.

In one implementation, the agent profile program is operable to generate an agent profile graphical user interface that includes an editable agent-specific vendor identification field and an editable agent-specific location identification field. The editable agent-specific vendor identification field receives the previously mentioned agent-specific vendor identifier and the editable agent-specific location identification field receives the agent-specific location identifier. In addition, the agent profile program is operable to populate the agent-specific vendor identification entry with the received agent-specific vendor identifier and populate the agent-specific location identification entry with the received agent-specific location identifier.

The agent feedback tool also includes an agent feedback program. The agent feedback program is operable to display an agent feedback graphical user interface. The agent feedback graphical user interface includes an agent selector entry, an agent-specific vendor identification field, and an agent-specific location identification field. The agent selector entry is configured to accept an agent identifier that identifies an agent.

In one implementation, the agent feedback program autopopulates one or more fields using the agent feedback mapping record. For example, the agent feedback program may reference the agent feedback mapping record using the agent identifier, or any other identifier, to retrieve the agent-specific vendor identifier and the agent-specific location identifier. After retrieving the agent-specific vendor identifier and the agent-specific location identifier, the agent feedback program may then autopopulate the agent-specific vendor identification field with the agent-specific vendor identifier and the agent-specific location identification field with the agent-specific location identifier. The agent feedback program is also operable to accept agent feedback and store a corresponding agent-specific agent feedback identifier in the agent-specific agent feedback entry Other systems, methods, features and advantages will be, or will become, apparent to one with skill in the art upon examination of the following figures and detailed description. All such additional systems, methods, features and advantages are included within this description, are within the scope of the invention, and are protected by the following claims.

BRIEF DESCRIPTION OF THE DRAWINGS

The system may be better understood with reference to the following drawings and description. The elements in the figures are not necessarily to scale, emphasis instead being placed upon illustrating the principles of the system. In the figures, like-referenced numerals designate corresponding parts throughout the different views.

FIG. 3 shows one example of an agent feedback mapping record.

DETAILED DESCRIPTION OF THE PREFERRED EMBODIMENTS

Figure 1:
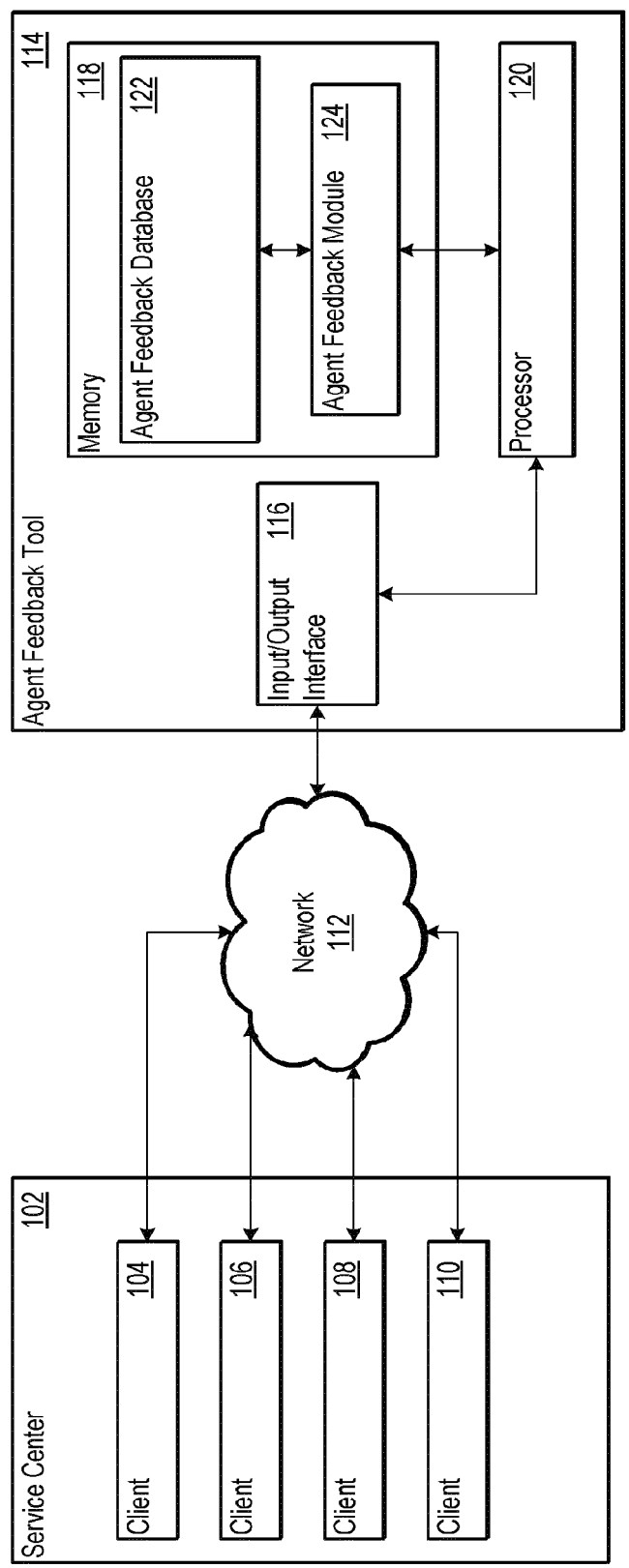
FIG. 1 shows one example of clients of a service center in communication with an agent feedback tool through a network.

FIG. 1 shows one example of clients 104-110 of a service center 102 in communication with an agent feedback tool 114 through a network 112. The network 112 may be a wide area network ("WAN"), a local area network ("LAN"), or other type of network. One example of a wide area network is the Internet. One example of a local area network is an intranet. The network 112 may be a wired network or a wireless network. The network 112 may be a packet-switched network, circuit-switched network, or other type of switching network. The network 112 may also be a combination of networks, such as a combination of WANs, LANs, wireless, wired, or other type of networks.

The clients 104-110 may be thin-clients, desktop computers, laptop computers, handheld devices, or any other type of computing client now known or later developed. The clients 104-110 may communicate with the agent feedback tool 114 using a computer program for displaying graphical elements, such as Microsoft Internet Explorer available from the Microsoft Corporation, located in Redmond, Wash. Another type of computer program for displaying graphical elements includes Firefox, available from the Mozilla Corporation, located in Mountain View, Calif. The clients 104-110 may also use other types of computer programs such as spreadsheet-based computer programs, document editing computer programs, or any other type of computer program now known or later developed.

The clients 104-110 communicate with the agent feedback tool 114 to manage agents and feedback for the agents. Agents include customer service representatives, call handlers, salesperson, and other types of individual who interact with the customers of an enterprise. Managing agents may include adding personal agent information, removing personal agent information, updating personal agent information, modifying agent information, adding agents, deleting agents, or other type of management. Examples of personal agent information include an agent's name, the agent's vendor or employer, the location of where the agent is employed, the duration of the agent's employment, the name of the agent's supervisor, or other personal agent information. Additional information for an agent is further described with reference to FIG. 3.

Feedback generally describes evaluative information derived from an interaction. In the context of the agent feedback tool 114, agent feedback describes evaluative information derived from an interaction between an agent and another actor, such as another agent, customer, vendor, or other entity. For example, the feedback for an agent may describe whether the feedback is for a complaint or commendation, a primary issue of the entity that led to the feedback, the cause of the feedback, and details relating to the cause of the feedback. Other types of feedback are also possible.

Managing the feedback may include a number of administrative and/or personal actions. In the context of administrative actions, managing feedback may include adding, removing, or updating the types or specific descriptions of feedback, and whether the types or specific descriptions of feedback are visible to a user of the agent feedback tool 114. As discussed with reference to FIG. 7, managing feedback may include managing primary agent feedback and managing secondary agent feedback. Any other level of feedback, such as tertiary or quaternary, is also possible.

In the context of personal actions, managing feedback may include providing, editing, or removing feedback for an agent. The feedback for an agent may also include primary agent feedback and secondary agent feedback. Primary feedback may be top-level feedback and secondary feedback may be feedback that provides additional details regarding a top-level feedback. Other feedback levels, such as tertiary and quaternary feedbacks, are also possible. Managing feedback for an agent may be based on the available, viewable, and/or selectable feedback.

The agent feedback tool facilitates managing of agents and feedback. In one implementation, the agent feedback tool 114 includes an input/output interface 116, a memory 118, and a processor 120. The input/output interface 116 receives instructions and communications from the clients 104-110 via the network 112. The input/output interface 116 may be any communication interface such as a hardware interface, a software interface, or a combination of hardware and software interfaces. Examples of hardware interfaces include a keyboard, a mouse, a network interface device, an IDE interface, a SATA interface, or any other hardware interface now known or later developed.

The input/output interface processes input from the clients 104-110 and passes the input to the processor 120. The processor 120 may be any type of hardware processor, software processor, or a combination of hardware and software processors. The processor 120 communicates the input to an agent feedback module 124 stored in a memory 118. The memory 118 may also store an agent feedback database 122.

The input received from the clients 104-110 may include database access requests, profile access requests, manage feedback requests, manage agent requests, or any other type of request. The input received from the clients 104-110 may also include data, such as a vendor identifier, location identifier, agent identifier, feedback, agent personal information, or any other information. Other types of inputs are also possible.

The agent feedback module 124 processes the input from the processor 120. The agent feedback module 124 may be implemented in hardware or software. In one implementation, the agent feedback module 124 is implemented using an Internet web site, a Structured Query Language ("SQL") 2005 database, and one or more Microsoft Excel spreadsheets. SQL 2005 is also commercially available from the Microsoft Corporation.

In processing the input, the agent feedback module 124 may communicate one or more database queries to the agent feedback database 122. After processing the input from the processor 120, the agent feedback module 124 communicates outputs to the processor 120, which are then communicated to the clients 104-110 via the input/output interface 116 and network 112. Outputs from the agent feedback module 124 may include instructions for displaying a graphical user interfaces, vendor information, location information, agent personal information, agent feedback information, or any other type of output now known or later developed. The outputs may also include instructions for displaying a mapping record, such as an agent feedback mapping record, a vendor identification mapping record, or any other type of mapping record.

Figure 2:
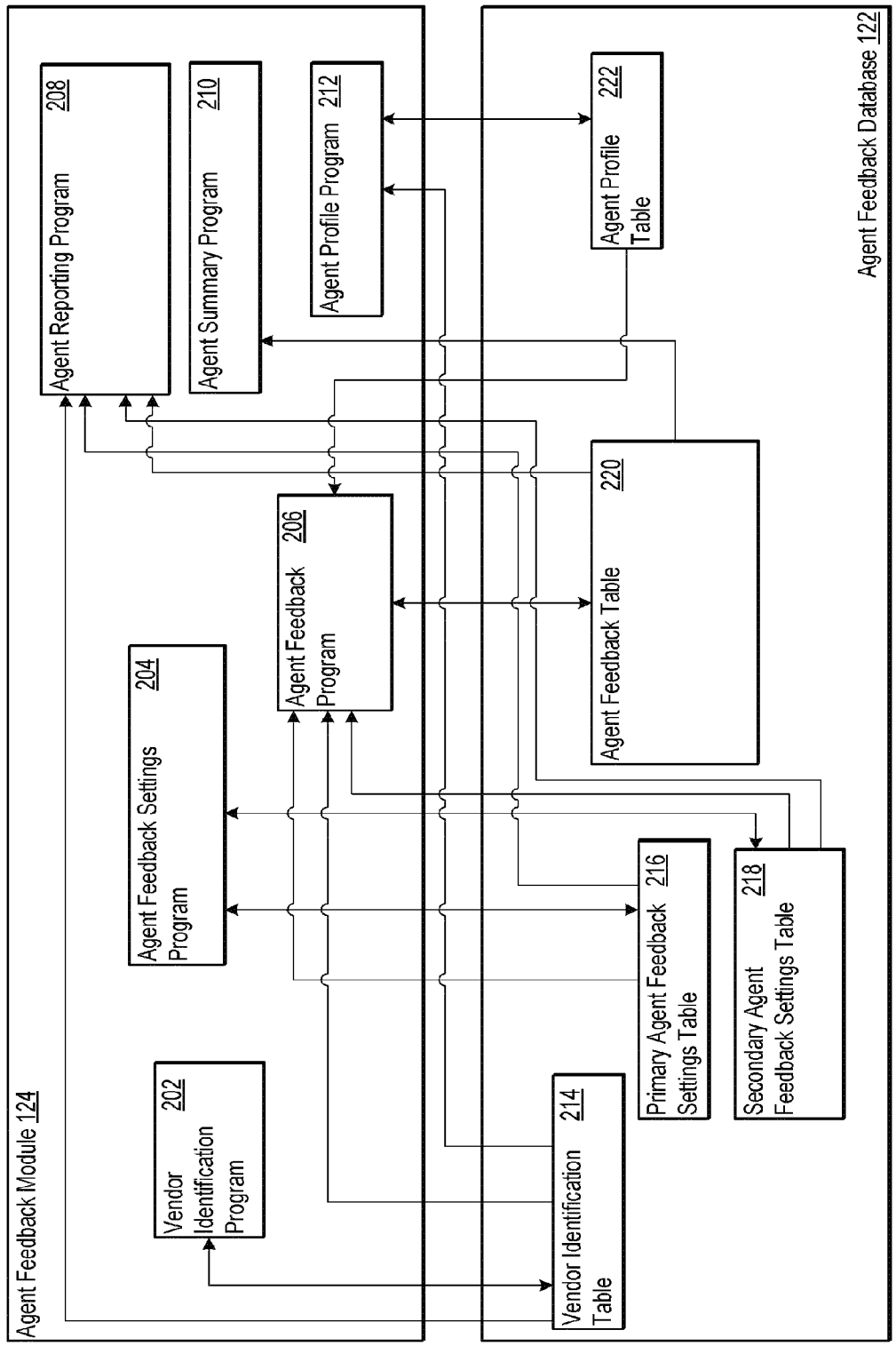
FIG. 2 shows one example of the agent feedback module in communication with an agent feedback database.
Figure 12:
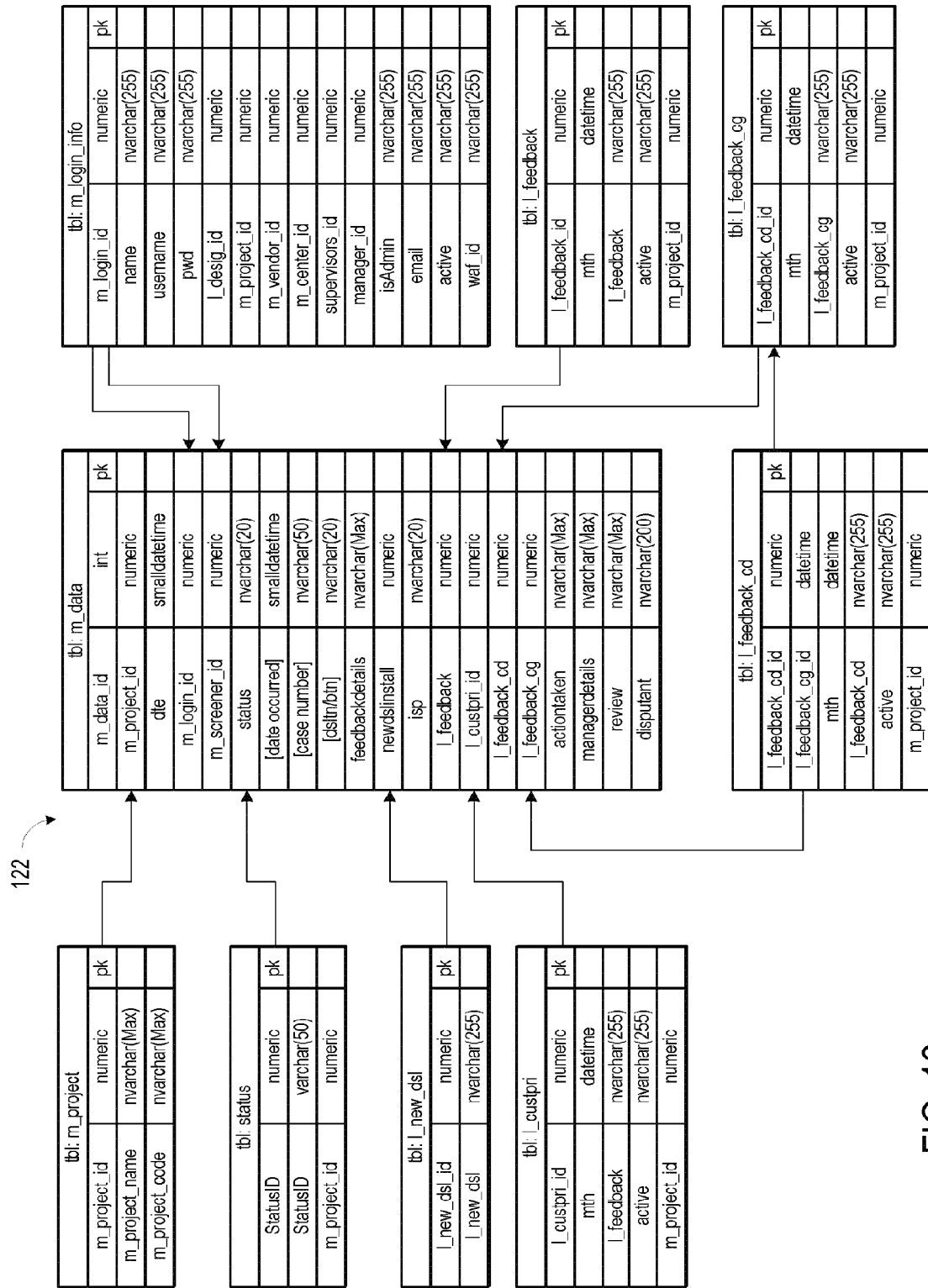
FIG. 12 shows one example of the agent feedback database.
Figure 13:
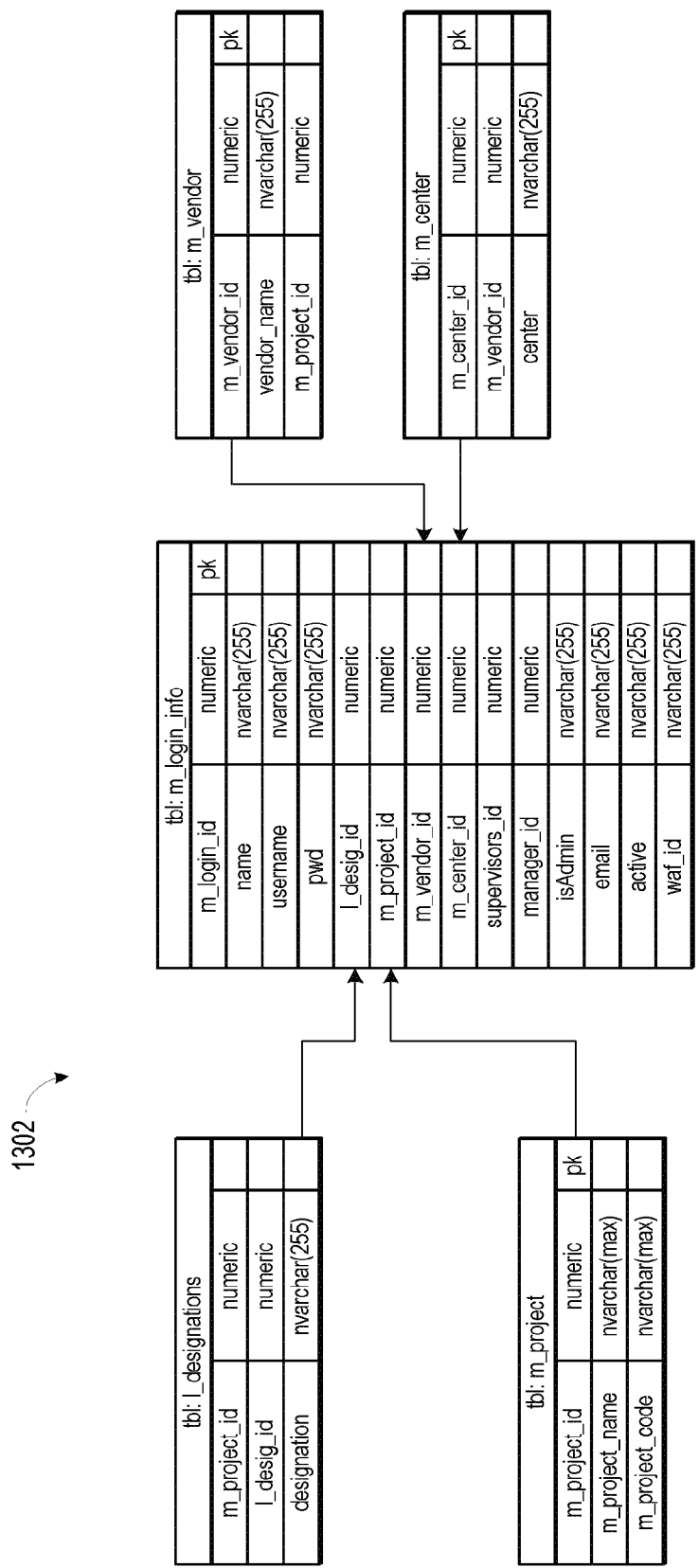
FIG. 13 shows one example of a login relational database

FIG. 2 shows one example of the agent feedback module 124 in communication with the agent feedback database 122. In one implementation, the agent feedback module 124 includes a vendor identification program 202, an agent feedback settings program 204, an agent feedback program 206, an agent reporting program 208, an agent summary program 210, and an agent profile program 212. Additional programs are also possible. The programs 202-212 may be implemented as individual programs, subroutines in one or more programs, a composite of programs, or any other type of implementation. FIG. 2 also shows an agent feedback database 122. The agent feedback database 122 may include a vendor identification table 214, a primary agent feedback settings table 216, a secondary agent feedback settings table 218, an agent feedback table 220, and an agent profile table 222. The agent feedback database 122 may be implemented as a relational database. Referring to FIG. 12 and FIG. 13, FIG. 12 is one example of an implementation of the agent feedback database 122 as a relational database, and FIG. 13 is one example of an implementation of a login relational database 1302. One or more of the tables shown in FIG. 12, such as the m_data table, may also be associated with the agent feedback record. The login relationship database 1302 may be used in authenticating a user when a user attempts to access the agent feedback tool 114.

Table 1 below describes the tables shown in FIGS. 12 and 13.

TABLE 1

| Table Name | Description |
| --- | --- |
| l_custpri | Stores customer primary issue identifiers. |
| l_designations | Stores designation identifiers. |
| l_feedback | Stores feedback type identifiers. |
| l_feedback_cd | Stores feedback cause detail identifiers. |
| l_feedback_cg | Stores feedback cause group identifiers. |
| l_new_dsl | Stores identifiers for a new DSL installation. |
| m_center | Stores agent-specific location identifiers. |
| m_data | Stores feedback provided for an agent. |
| m_login_info | Stores login details for a user. |
| m_project | Stores project identifiers. |
| m_vendor | Stores agent-specific vendor identifiers. |
| status | Stores feedback status identifiers. |

Table 2 below describes the fields shown in FIGS. 12 and 13.

TABLE 2

| Field Name | Description |
| --- | --- |
| [case number] | Identifies a case number of the issue that led to the feedback. |
| [date occurred] | Identifies a date of the issue that led to the feedback. |
| [dsltn/btn] | Identifies a DSLTN/BTN installation. |
| actiontaken | Populated with notes by a team lead with actions that have been taken to address the issue that led to the feedback. |
| active | Identifies whether a feedback is active or inactive. |
| center | Identifies a center where the agent was located when the issue leading to the feedback occurred. |
| designation | Identifies a title of the agent. |
| disputant | Identifies the agent associated with the provided feedback. |
| dte | Identifies a date when the feedback was submitted. |
| email | Identifies an e-mail address of the person submitting the feedback. |
| feedbackdetails | Populated with notes relating to the feedback. |
| isAdmin | Identifies whether a person submitting the feedback has administration privileges. |
| isp | Identifies an Internet Service Provider for a DSLTN/BTN installation. |
| l_custpri_id | Identifies a numeric identifier for the customer primary issue. |

TABLE 2-continued

| Field Name | Description |
| --- | --- |
| l_desig_id | Identifies a numeric identifier for the title of the agent. |
| l_feedback | Identifies a type of feedback provided. |
| l_feedback_cd | Identifies a feedback cause detail. |
| l_feedback_cd_id | Identifies a numeric identifier for the feedback cause detail. |
| l_feedback_cg | Identifiers a feedback cause group. |
| l_feedback_cg_id | Identifies a numeric identifier for the feedback case group. |
| l_feedback_id | Identifies a numeric identifier for the type of feedback provided. |
| l_new_dsl | Identifies whether a new DSL installation was being provided at the time the issue leading to the feedback occurred. |
| l_new_dsl_id | Identifies a numeric identifier for a new DSL installation. |
| m_center_id | Identifies a location identifier, which may be an agent-specific location identifier or a vendor-specific location identifier. |
| m_data_id | Identifies a unique numeric identifier for the provided feedback. |
| m_login_id | Identifies a unique login identifier. |
| m_month | Identifies a month. |
| m_project_code | Identifies a project abbreviation code for a project. |
| m_project_id | Identifies a numeric project identifier for a project. |
| m_project_name | Identifies a project name for a project. |
| m_screener_id | Identifies a numeric identifier of the entity submitting feedback. |
| m_vendor_id | Identifiers a numeric identifier for a vendor, which may be an agent-specific vendor identifier or a global vendor identifier. |
| manager_id | Identifies a numeric identifier for a manager. |
| managerdetails | Populated with notes relating to the manager and actions taken for the provided feedback. |
| mth | Identifies a month. |
| name | Identifies a name for the login information. |
| newdslinstall | Identifies whether a new DSL installation was being provided at the time the issue leading to the feedback occurred. |
| pwd | Identifies a password for the login information. |
| review | Identifies a reviewer for the provided feedback. |
| status | Identifies the status of the feedback. |
| StatusID | Identifies the status of the feedback, which may be a numeric identifier or other identifier. |
| supervisors_id | Identifies a numeric identifier for a supervisor. |
| username | Identifies a username for the login information. |
| vendor_name | Identifies a vendor's name. |
| waf_id | Identifies a numeric identifier that identifies a training group of the agent. The training group identifier may identify whether a group of agents are problematic. |

Referring back to FIG. 2, in one implementation, the vendor identification program 202 is in communication with the vendor identification table 214. The vendor identification program 202 facilitates the management of vendor information stored in the vendor identification table 214. A vendor may be the entity that employs the agent. However, the vendor may also have some other relation to the agent.

The vendor identification table 214 may include one or more vendor identification mapping records. A vendor mapping record may include a global vendor identification entry and a vendor-specific location identification entry. The global vendor identification entry stores a vendor identifier that identifies a vendor. The global vendor identification entry is global because it may be accessed by one or more programs, such as the agent feedback program 206 or other programs. The vendor-specific location identification entry stores a vendor-specific location identifier that identifies a location specific to the vendor. For example, the vendor-specific location identifier may identify a geographic location of the vendor, such as where the vendor is headquartered, or the vendor-specific location identifier may identify a location where the vendor operates. The vendor-specific location identifier may identify other locations, such as where the vendor has clients or other contacts. Other locations identified by the vendor-specific location identifier are also possible. Table 3 below shows one example of a vendor identification mapping record.

TABLE 3

| Global Vendor Identification Entry | Vendor-Specific Location Identification Entry | Vendor-Specific Location Identification Entry |
|---|---|---|
| Convergys | Nebraska | Manila |
| Accenture | Dallas | |
| Unknown | Unknown | |
| Cold Transfer | Cold Transfer | |

As shown in Table 3, the vendor-identification table has four mapping records. The first mapping record identifies that the vendor identifier "Convergys" is associated with the vendor-specific location identifiers "Nebraska" and "Manila." Similarly, a second mapping record identifies that the vendor "Accenture" is associated with the vendor-specific location identifier "Dallas." Using the vendor identification program 202, one or more of the clients 104-110 may modify one or more of the vendor mapping records. For example, a client may remove the vendor-specific location identifier "Manila" or a client may remove an entire mapping record. A client may also add vendor-specific location identifiers or add global vendor identifier to the vendor identification table. Other modifying actions are also possible.

The agent feedback settings program 204 facilitates the management of global primary agent feedback identifiers and global secondary agent feedback identifiers. A global primary agent feedback identifier identifies a global primary agent feedback. Moreover, each of the global primary agent feedback identifiers may be associated with a global primary agent feedback category that categorically describes the type of the global primary agent feedback. Examples of global primary agent feedback categories include "Feedback Type," "Customer Primary Issue," and "Feedback Cause Group." Other types of global primary agent feedback categories are also possible.

The agent feedback settings program 204 communicates with a primary agent feedback settings table 216 to manage the global primary agent feedback identifiers. The primary agent feedback settings table 216 may include one or more global primary agent feedback setting entries that store the global primary agent feedback setting identifiers. The global primary agent feedback setting entries may be global so that the global primary agent feedback setting entries are accessible to one or more programs, such as the agent feedback program 206. The primary agent feedback settings table 216 may also include global primary agent feedback mapping records that associate the global primary agent identifiers to the global primary agent feedback categories. Table 4 below shows one example of global primary agent feedback mapping records.

TABLE 4

| Global Primary Agent Feedback Category | Global Primary Agent Feedback Identifier | Global Primary Agent Feedback Identifier | Global Primary Agent Feedback Identifier |
|---|---|---|---|
| FeedBack Type | Coaching Opportunity | Commendation | Executive Complaint |
| Customer Primary Issue | Billing Issue | Broadband Connectivity | Broadband Wireless Issue |
| Feedback Cause Group | Commendation | Communication Effectiveness | Informational |

As shown in Table 4, the primary agent feedback settings table 216 has three global primary agent feedback mapping records. A first mapping record associates the global primary agent feedback category of "FeedBack Type" with the global primary agent feedback identifiers "Coaching Opportunity," "Commendation," and "Executive Complaint." Similarly, a second global primary agent feedback mapping record associates the global primary agent feedback category of "Customer Primary Issue" with the global primary agent feedback identifiers of "Billing Issue," "Broadband Connectivity," and "Broadband Wireless Issue." Alternative global primary agent feedback mapping records are also possible.

The agent feedback settings program 204 also communicates with a secondary agent feedback settings table 218 to manage global secondary agent feedback identifiers. A secondary agent feedback identifier identifies a secondary agent feedback that further describes a primary agent feedback. Hence, one or more of the secondary agent feedback identifier may be associated with a primary agent feedback identifier.

The global secondary agent feedback settings table 218 may include one or more global secondary agent feedback setting entries that store the global secondary agent feedback setting identifiers. The global secondary agent feedback setting entries may be global so that the global secondary agent feedback setting entries are accessible to one or more programs, such as the agent feedback program 206. The secondary agent feedback settings table 218 may also include global secondary agent feedback mapping records that associate the global secondary agent identifiers to global secondary agent feedback categories and the global primary agent feedback identifiers. Table 5 below shows one example of a global secondary agent feedback mapping record.

TABLE 5

| Global Secondary Agent Feedback Category | Global Primary Agent Feedback Identifier | Global Secondary Agent Feedback Identifier |
|---|---|---|
| Feedback Cause Detail | Commendation | Customer Commendation |
| Feedback Cause Detail | Commendation | Agent Commendation |
| Feedback Cause Detail | Commendation | Client Commendation |

As shown in Table 5, the global secondary agent feedback mapping record associates a global secondary agent feedback category of "Feedback Cause Detail" and a global primary agent feedback identifier "Commendation" with three global secondary agent feedback identifiers: "Customer Commendation," "Agent Commendation," and "Client Commendation." Alternative or additional global secondary agent feedback mapping records are also possible. For example, each of the global primary agent feedback identifiers identified in Table 5 may also be associated with a global secondary agent feedback identifier.

The agent profile program 212 facilitates the management of agent profile information. In one implementation, the agent profile program 212 communicates with the agent profile table 222 and the vendor identification table 214 to manage the agent profile information. The agent profile program 212 may also communicate with additional or alternative tables.

The agent profile table 222 includes an agent-specific vendor identification entry storing an agent-specific vendor identifier, an agent-specific location identification entry storing an agent-specific location identifier, and an agent identification entry storing an agent identifier. The agent profile table 222 may also manage alternative or additional identifies relating to agent profile information. Moreover, the agent profile table 222 may include agent profile mapping records that associate the various agent profile identifiers with an agent profile identifier. In managing the agent profile table 222, the agent profile program 212 may refer to one or more additional tables, such as the vendor identification table 214. Table 6 below lists and describes examples of identifiers that may be managed by the agent profile table 222. Additional agent profile identifiers are also possible.

TABLE 6

| Agent Profile Identifier | Description |
| --- | --- |
| Agent-Specific Name Identifier | Identifies the name of the agent. |
| Agent-Specific Project Identifier | Identifies the project of the agent |
| Agent-Specific Screener Identifier | Identifies the screener identifier for the agent |
| Agent-Specific Password Identifier | Identifies the password for the agent to access the Agent Feedback Tool. |
| Agent-Specific Email identifier | Identifies the e-mail address for the agent |
| Agent-Specific Vendor Identifier | Identifies the vendor of the agent |
| Agent-Specific Location Identifier | Identifies the location of the vendor of the agent |
| Agent Identifier | Identifies the agent |
| Agent-Specific Designation Identifier | Identifies the access level for the agent. Examples include "User" and "Administrator." |
| Agent-Specific Supervisor Identifier | Identifies the agent's supervisor. |
| Agent-Specific Manager Identifier | Identifies the agent's manager. |
| ATTUID | A unique agent identifier that is offered by a project client for use in project client applications. |

The agent feedback program 206 facilitates the management of feedback for an agent. In one implementation, the agent feedback program 206 communicates with the vendor identification table 214, the primary agent feedback settings table 216, the secondary agent feedback settings table 218, and the agent profile table 222 for managing the feedback for an agent. In one implementation, the agent feedback program 206 stores the feedback for an agent in the agent feedback table 220. The agent feedback table 220 may include an agent feedback mapping record that has an agent-specific vendor identification entry storing an agent-specific vendor identifier and an agent-specific location identification entry storing an agent-specific location identifier. The agent feedback mapping record may also include an agent identification entry storing an agent identifier and an agent-specific agent feedback entry storing an agent-specific agent feedback identifier.

The agent feedback program 206 may refer to one or more tables, such as the agent profile table 222, the vendor identification table 214, the primary agent feedback settings table 216, or the secondary agent feedback settings table 218 for populating the entries of the agent feedback mapping record. Alternatively, the agent feedback mapping record may be a composite of one or more records. For example, the agent feedback mapping record may be a composite of a mapping record of the agent feedback table 220 and a mapping record of the agent profile table 222. In generating the composite mapping record, the agent feedback program 206 may access both the agent feedback table 220 and the agent profile table 222. One example of an agent feedback mapping record is discussed with reference to FIG. 3.

The agent reporting program 208 and the agent summary program 210 each generate reports and summaries, respectively, for the agent feedback tool 114. In generating reports, the agent reporting program 208 may refer to one or more tables, such as the agent feedback table 220, the agent profile table 222, or other tables. Similarly, in generating summaries, the agent summary program may also refer to one or more tables, such as the agent feedback table 220, the agent profile table 222, or other tables. In one implementation, the agent reporting program 208 retrieves an agent feedback mapping record from the agent feedback table 220 and displays the agent feedback mapping record. The agent reporting program 208 is further discussed with reference to FIG. 10.

Similarly, the agent summary program 210 may communicate with the agent feedback table 220 to generate summaries of agent feedback. For example, the agent feedback table 220 may generate a summary of agent feedback according to a vendor identifier, a location identifier, a feedback status identifier that identifies the status of the feedback, an agent identifier, or any other number of identifiers. The agent summary program 210 is further discussed with reference to FIG. 5.

FIG. 3 shows one example of an agent feedback mapping record 302. The agent feedback mapping record 302 includes a number of agent-specific entries 304-350. The agent-specific entries 304-350 may store identifiers that may be stored in other mapping records, such as the agent profile mapping records of the agent profile table 222. For example, the agent feedback program 206 may reference the agent profile table 222 to populate one or more of the agent-specific entries 304-350 of the agent feedback mapping record 302.

As shown in FIG. 3, the agent feedback mapping record 302 includes: a numerical feedback identifier 304 that identifies the numeral identification for this particular feedback, an editable selection control 306 that is dynamically linked to the agent feedback mapping record 302 that, when manipulated, brings the details of the agent feedback mapping record 302 to an editable form, a date identifier 308 that identifies the date of when the feedback was entered, an agent identifier 310 that identifies the agent for the feedback, a submitter identifier 312 that identifies the submitter (e.g., one of the clients 104-110) of the feedback, a status identifier 314 that identifies the status of the feedback (e.g., valid, invalid, pending, disputed, or reviewed), an action date identifier 316 that identifies a date on which action was taken in response to the feedback, an action taken identifier 318 that identifies the action that was taken in response to the feedback, an agent-specific vendor identifier 320 for the agent, and an agent-specific location identifier 322 for the agent.

The agent feedback mapping record 302 also includes a date occurred identifier 324 that identifies when the incident leading to the feedback occurred, a case identifier 326 that identifies the case on which the agent was working that led to the feedback, a DSL/TN identifier 328 that identifies a DSL/TN number, a feedback details 330 that identifies the specific details of the feedback, a manager date identifier 332 that identifies, a manager details identifier 334 that identifies, a review date identifier 336 that identifies, a review response identifier 338 that identifies, a new DSL identifier 340 that identifiers, and an ISP identifier 342 that identifies. Finally, the agent mapping record 302 includes agent-specific agent feedback identifiers 344-350. The agent-specific agent feedback identifiers 344-350 comprise a composite of primary and second agent feedback identifiers. For example, the agent-specific feedback includes agent-specific primary agent feedback identifiers 344-348 and an agent-specific secondary agent feedback identifier 350.

Figure 4:
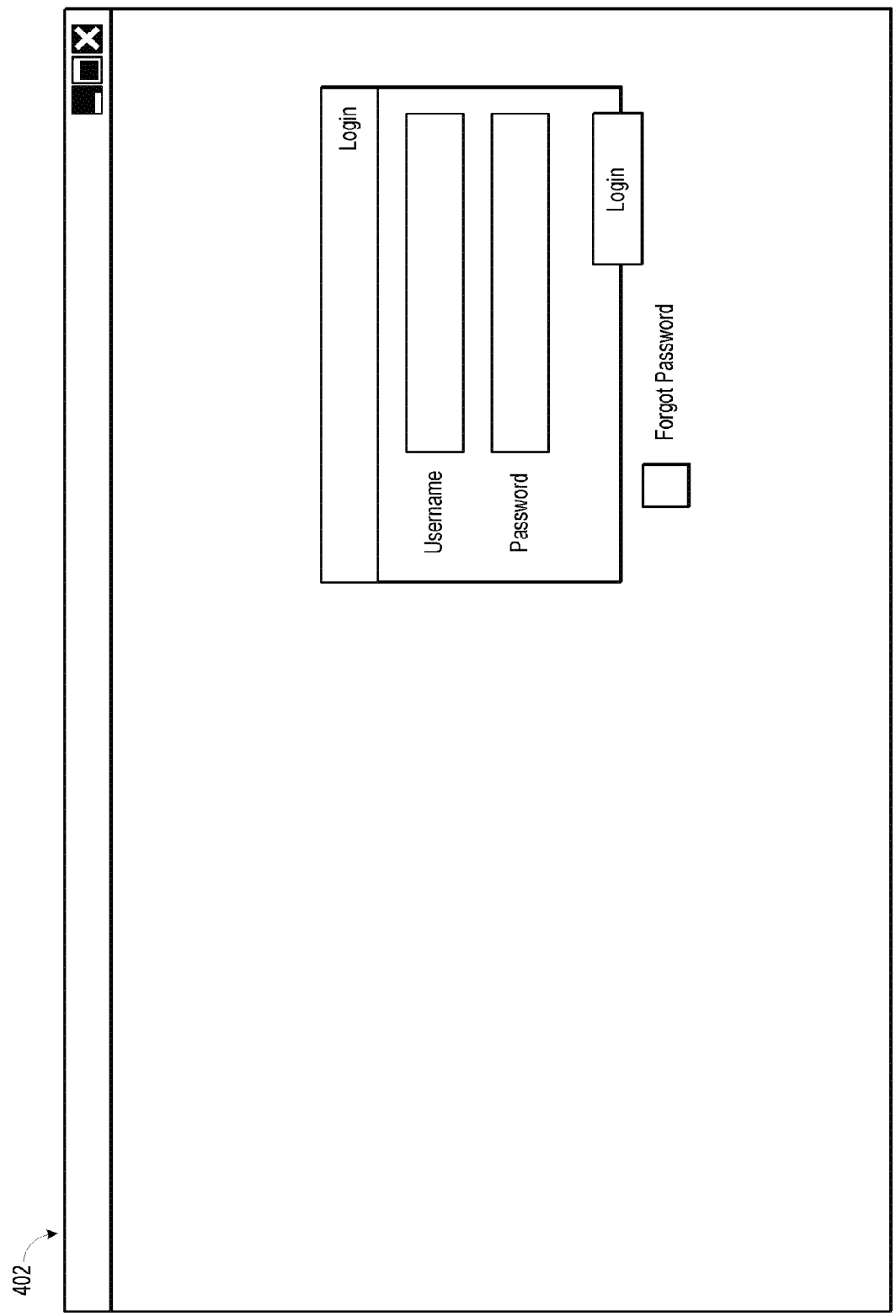
FIG. 4 shows one example of a graphical user interface for authenticating a user.

FIGS. 4-10 describe graphical user interfaces that the agent feedback tool 114 generates. FIG. 4 shows one example of a graphical user interface for authenticating a user, such as one or more of the clients 104-110, prior to granting the user access to the agent feedback tool 114. In one implementation, the graphical user interface 402 includes a username field and a password field. The values entered in the username field and the password field may be compared against an authenticated user database for determining whether the user should have access to the agent feedback tool 114. Alternatively, the values entered in the username field and the password may be compared against the identifiers in the agent profile mapping record.

Figure 5:
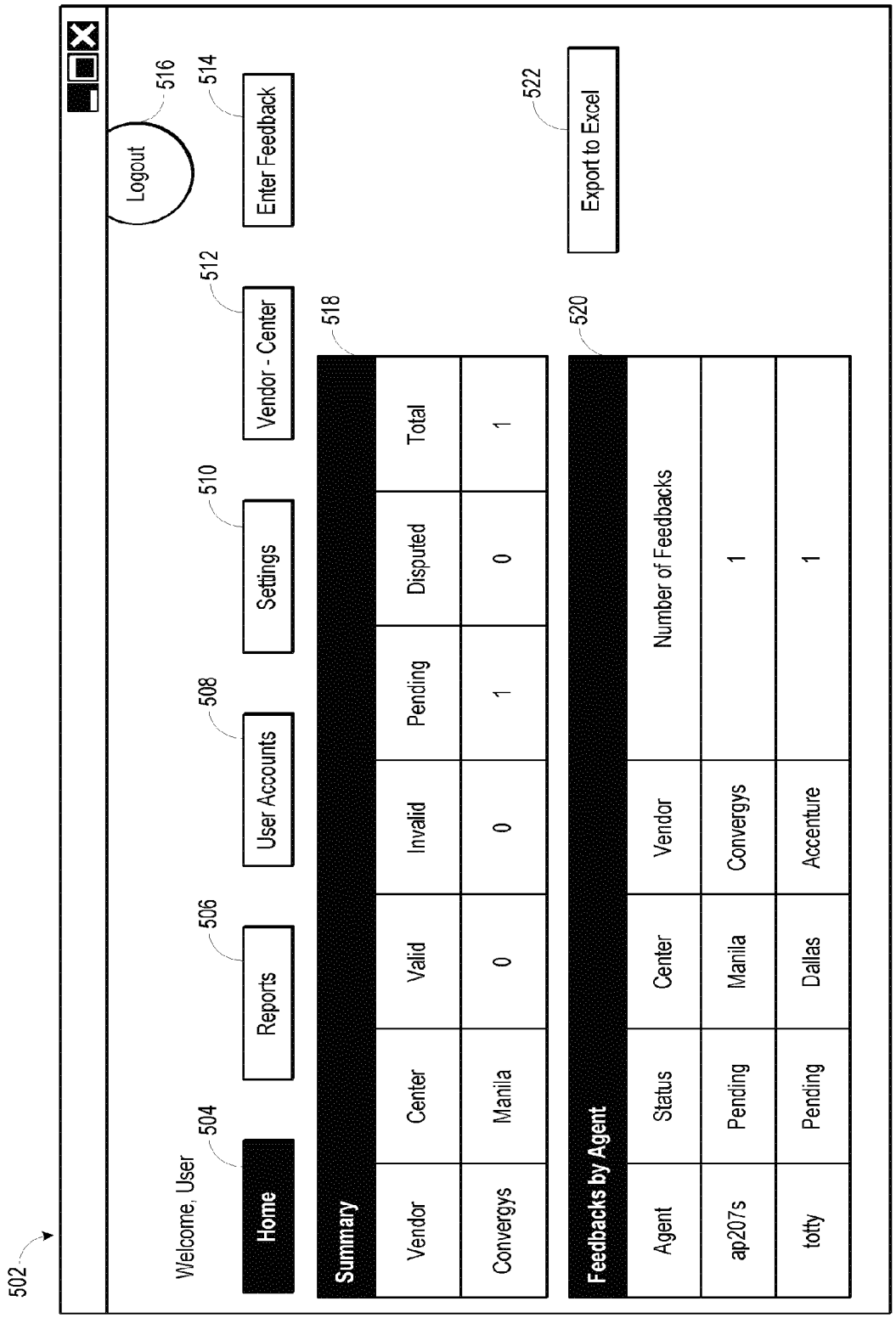
FIG. 5 shows one example of an agent summary graphical user interface.

After being authenticated, the agent summary program 210 outputs instructions for generating an agent summary graphical user interface. FIG. 5 shows one example of an agent summary graphical user interface 502. The agent summary graphical user interface 502 includes manipulative agent feedback tool controls 504-516. Manipulation of the controls may include clicking, selecting, pressing, or otherwise manipulating the control.

The agent feedback tool controls 504-516 include a home control 504, a reports control 506, a user accounts control 508, a settings control 510, a vendor-center control 512, a feedback control 514, and a logout control 516. Manipulating the controls 504-516 instructs the agent feedback tool programs to generate a corresponding graphical user interface. For example, manipulating the reports control 506 may instruct the agent reporting program 208 to generate an agent reporting graphical user interface. In one implementation, the reports control 506 is associated with the agent reporting 208, the user accounts control 508 is associated with the agent profile program 212, the settings control 510 is associated with the agent feedback settings program 204, the vender-center control 512 is associated with the vendor identification program 202, and the feedback control 514 is associated with the agent feedback program 206. The logout control 516 may be configured to instruct the agent feedback tool 114, or any of the agent feedback programs 202-212, to cease operation for the particular user that manipulated the control 516.

The agent summary graphical user interface 502 includes an agent feedback summary status chart 518 and an agent feedback summary chart 520. The agent feedback summary status chart 518 displays information relating to the status of feedbacks for a vendor. As shown in FIG. 5, the feedback summary status chart 518 shows that the vendor identified as "Convergys" has 1 pending agent feedback and a total of 1 agent feedback. The agent feedback summary chart 520 displays information relating to the agent feedback for specific agents. As shown in FIG. 5, the agent feedback summary 520 displays that the agent identified as "ap207s" has 1 feedback and the agent "totty" has 1 feedback.

The agent summary program 208 may generate the agent feedback summary status chart 518 and the agent feedback summary chart 520 by querying one or more of the tables 214-222 in the agent feedback database 122. For example, the agent summary program 208 may generate the summary charts 518-520 by querying the agent feedback table 220 outputting the results of the query. The agent summary program 208 may also generate summary charts for specific vendors, specific locations, or other criteria.

The agent summary graphical user interface 502 also includes an export control 522 that facilitates the exporting of the displayed information. In one implementation, the export control 522 facilitates the exporting of the displayed information to a preconfigured file format, such as the Microsoft Excel file format, also available from the Microsoft Corporation. The agent summary graphical user interface 502 may include an import control that facilitates the importing of agent feedback.

Figure 6:
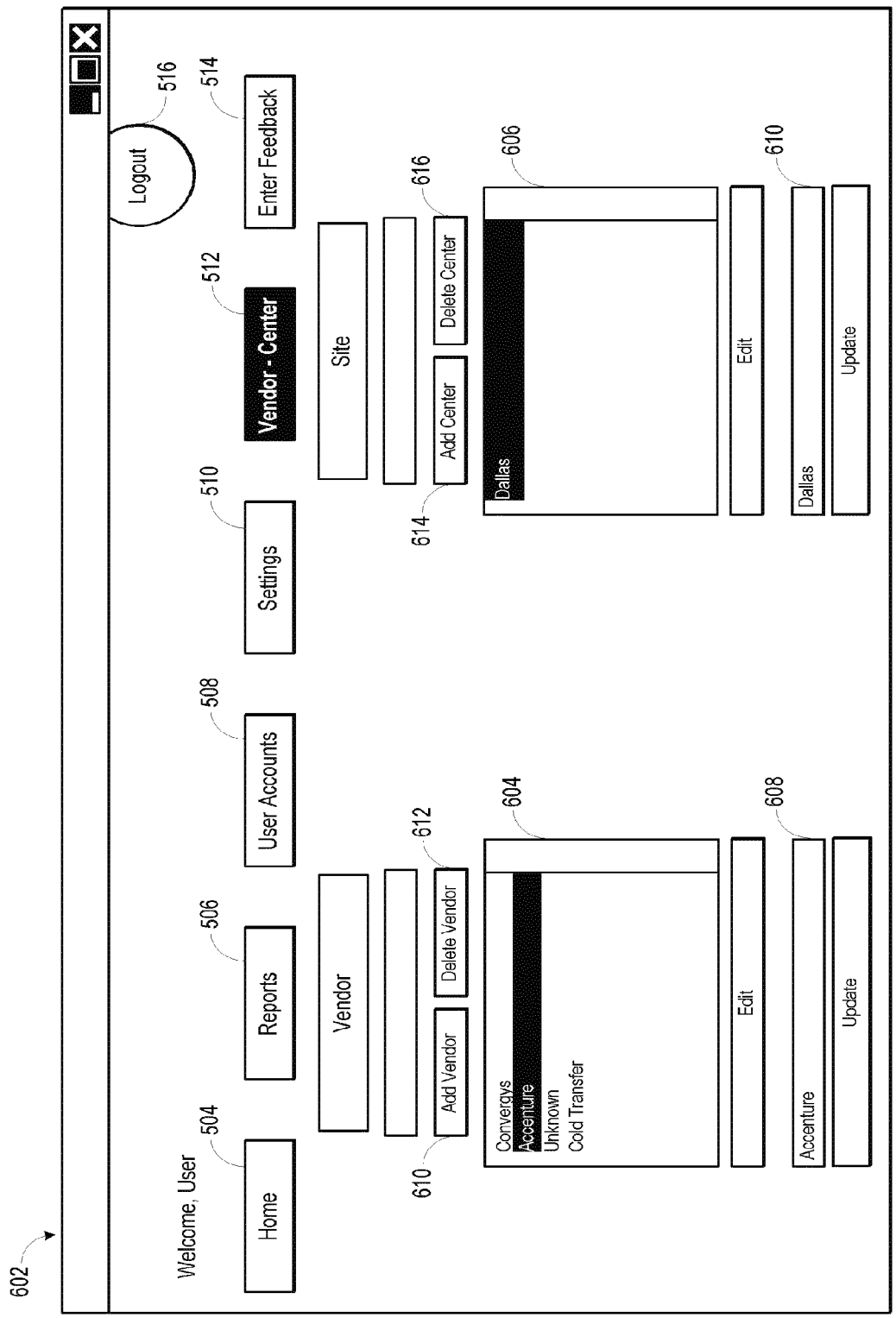
FIG. 6 shows one example of a vendor identification graphical user interface.

FIG. 6 shows one example of a vendor identification graphical user interface 602 generated by the vendor identification program 202. The vendor identification graphical user interface 602 includes a vendor selection control 604 and a vendor-specific location selection control 606. The vendor selection control 604 facilitates the selection of a global vendor identifier, and the vendor-specific location selection control 606 facilitates the selection of a vendor-specific location identifier for the selected global vendor identifier. In one implementation, the vendor identification program 202 queries the vendor identification table 214 for a list of global vendor identifiers and vendor-specific location identifiers, and populates the vendor selection control 604 and the vendor-specific control 606 with the results of that query. The locations displayed in the vendor-specific location control 606 may be displayed according to the global vendor identifier selected in the vendor selection control 604.

The vendor identification graphical user interface 602 also includes controls for populating the global vendor identification entries and the vendor-specific location entries of the vendor identification table 214. For example, the vendor identification graphical user interface 602 includes an editable global vendor identification field 608 that receives a global vendor identifier and an editable vendor-specific location identification field 610 that receives a vendor-specific location identifier. To populate the vendor identification table 214 with the global vendor identifier, the vendor identification graphical user interface 602 includes an add vendor control 610. Manipulation of the add vendor control 610 adds the global vendor identifier displayed in the editable global vendor identification field 608 to the vendor identification table 214. To remove a global vendor identifier from the vendor identification table 214, the vendor identification graphical user interface 602 includes a delete vendor control 612. Manipulation of the delete vendor control 612 removes the global vendor identifier selected in the vendor selection control 604 from the vendor identification table 214.

Similarly, the vendor identification graphical user interface 602 also includes controls for adding and removing vendor-specific location identifiers to the vendor identification table 214. For example, to populate the vendor identification table 214 with a vendor-specific location identifier, the vendor identification graphical user interface 602 includes an add center control 614. Manipulation of the add center control 614 adds the vendor-specific location identifier displayed in the editable vendor-specific location identification field 610 to the vendor identification table 214. In addition, when the vendor-specific location identifier is added to the vendor identification table 214, the vendor identification program 202 also associates the global vendor identifier selected in the vendor selection control 604 with the added vendor-specific location identifier. To remove a vendor-specific location identifier from the vendor identification table 214, the vendor identification graphical user interface 602 includes a delete center control 616. Manipulation of the delete center control 616 removes the vendor-specific location identifier selected in the location selection control 606 from the vendor identification table 214.

Figure 7:
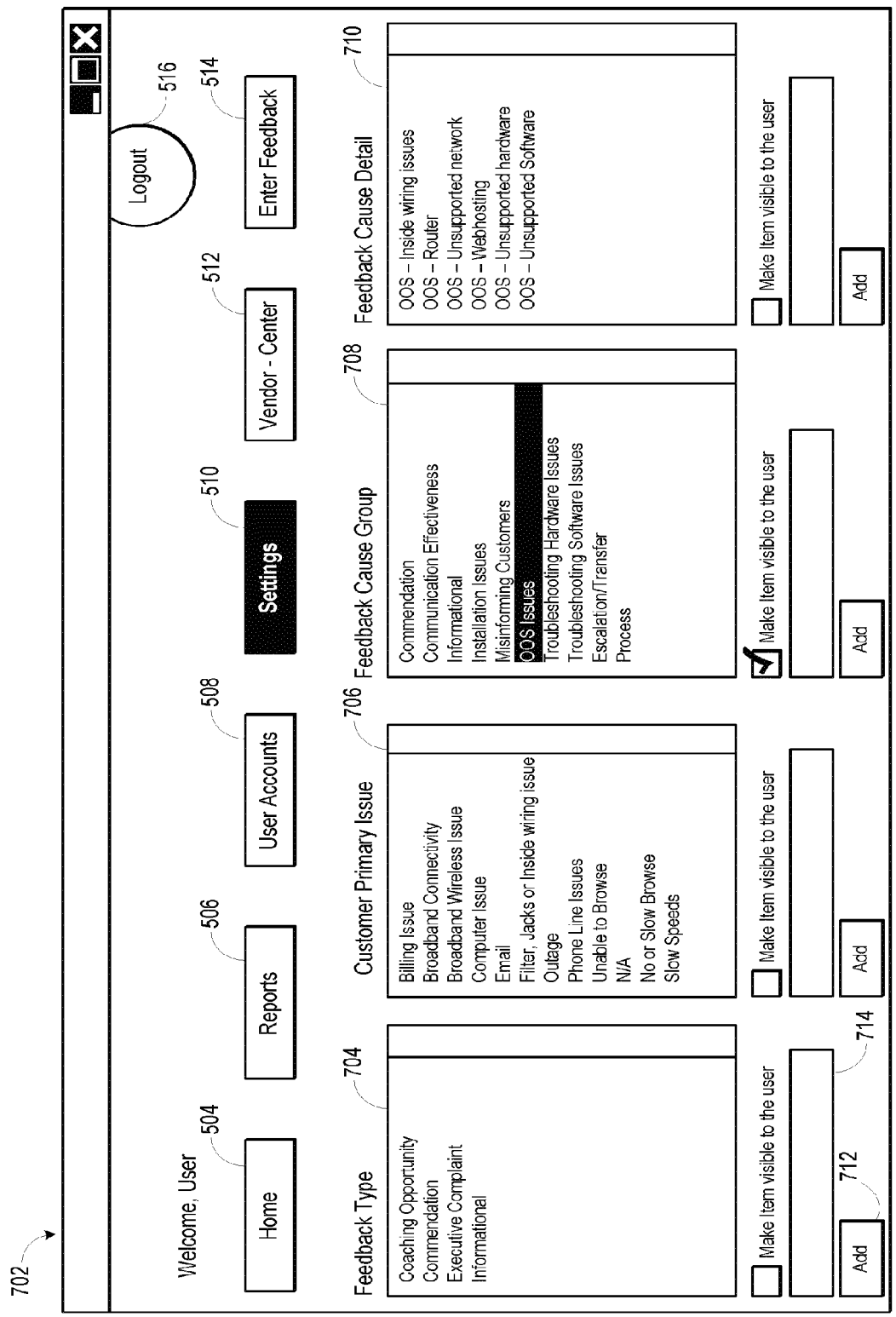
FIG. 7 shows one example of an agent feedback settings graphical user interface.

FIG. 7 shows one example of an agent feedback settings graphical user interface 702. The agent feedback settings program 204 may generate the agent feedback settings graphical user interface 702. The agent feedback settings graphical user interface 702 displays the global primary agent feedback identifiers stored in the primary agent feedback settings table 216 and the global secondary agent feedback identifiers stored in the secondary agent feedback settings table 218. As shown in FIG. 7, the agent feedback settings graphical user interface 702 displays three global primary agent feedback categories ("Feedback Type," "Customer Primary Issue," and "Feedback Cause Group") and one global secondary agent feedback category ("Feedback Cause Detail"). The agent feedback settings graphical user interface 702 also includes global primary agent feedback selection controls 704-708 and a global secondary agent feedback selection control 710. In one implementation, the agent feedback settings graphical user interface 702 displays the global secondary agent feedback identifiers of the global secondary agent feedback selection control 710 based on the global primary agent feedback identifier selected in the global primary agent feedback selection control 708. Additional agent feedback categories and selection controls are also possible.

The agent feedback settings graphical user interface 702 also includes controls for manipulating the global primary agent feedback identifiers and the global secondary agent feedback identifiers. For example, the agent feedback settings graphical user interface 702 includes an add feedback control 712 and an editable global primary agent feedback field 714. The editable global primary agent feedback field 714 is configured to receive a global primary agent feedback identifier and is associated with a global primary agent feedback category. When the add feedback control 712 is manipulated, the global primary agent feedback identifier displayed in the editable global primary agent feedback field 714 is added to the global primary agent feedback selection control 704 and the primary feedback settings table 216 is updated with the added global primary agent feedback identifier. The agent feedback settings graphical user interface 702 also includes an add feedback control and an editable global secondary agent feedback field for the global secondary agent feedback categories.

In addition, the agent feedback settings graphical user interface 702 includes controls that determine whether a global primary agent feedback identifier or a global secondary agent feedback identifier is accessible (i.e. "visible") to a user when a user is providing feedback on an agent. When the global primary agent feedback identifier or the global secondary agent feedback identifier is visible, a user may provide feedback for the agent using the visible identifier. However, when the global primary agent feedback identifier or the global secondary agent feedback identifier is not visible, a user may be prevented from providing feedback for the agent using the non-visible identifier. One or more of the global primary agent feedback identifiers may be visible or non-visible. Similarly, one or more of the global secondary agent feedback identifiers may be visible or non-visible.

Figure 8:
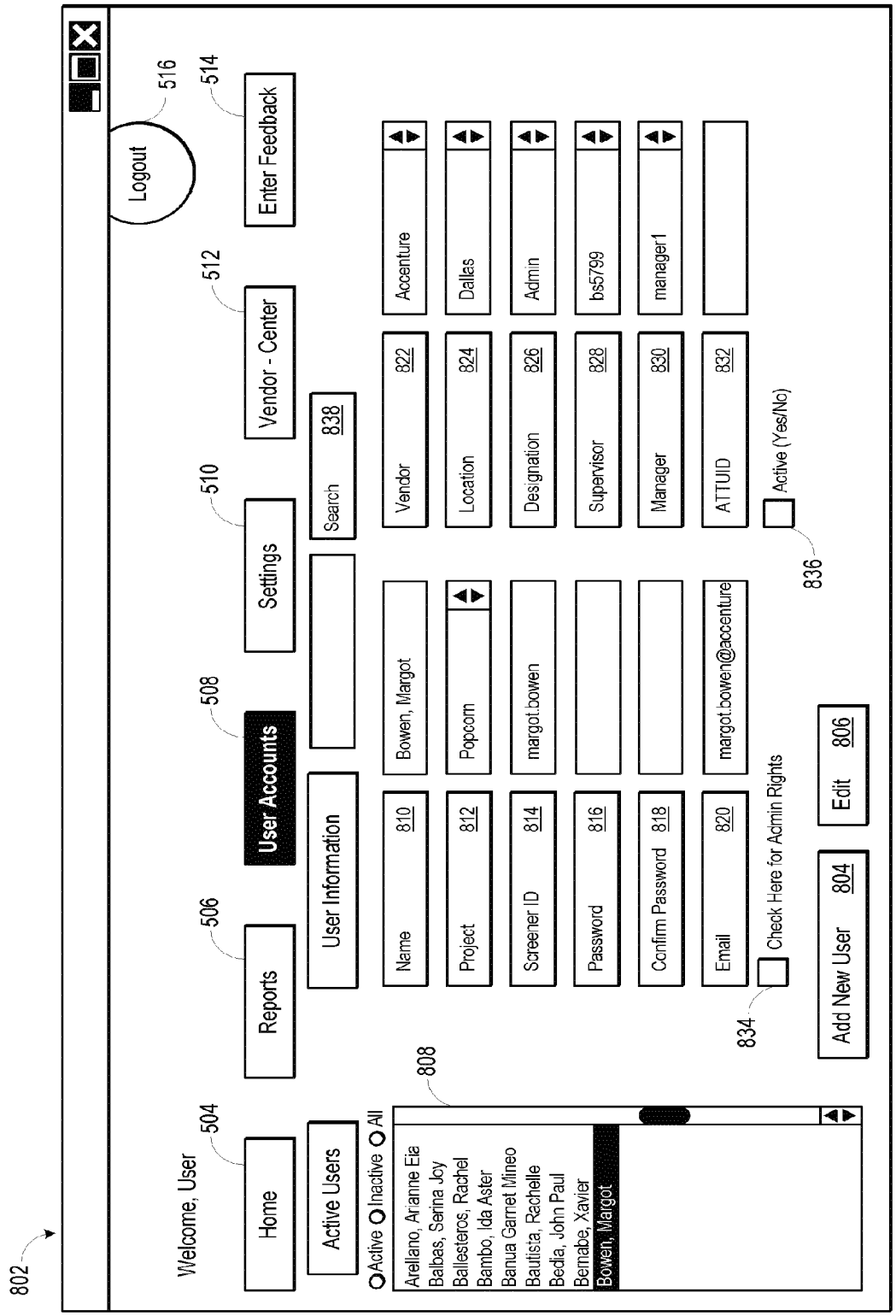
FIG. 8 shows one example of an agent profile graphical user interface.

FIG. 8 shows one example of an agent profile graphical user interface 802 for managing and updating agent profile information. The agent profile program 212 may generate the agent profile graphical user interface 802. In one implementation, the agent profile graphical user interface 802 includes an add new user control 804 and an edit user control 806. Manipulation of the add new user control 804 adds a new agent or user to the agent profile table 222. Manipulation of the edit user control 806 edits the profile information of a previously existing user or agent in the agent profile table 222.

The agent profile graphical user interface 802 also includes an agent selection control 808. The agent selection control 808 facilitates the selection of agents from the agent profile table 222. In one implementation, the agent profile program 212 queries the agent profile table 222 for existing agent profiles, and the agent profile program 212 populates the agent selection control 808 with the results of the query. An agent may be selected by manipulating the agent selection control 808. When an agent is selected, the agent profile identifiers are retrieved from the agent profile table 222 and populated into the editable fields 810-832.

The agent profile graphical user interface 802 is also operable to display editable fields for editing and providing agent profile identifiers. In one implementation, the profile graphical user interface 802 displays an editable agent-specific name field 810 that receives an agent name identifier, an editable agent-specific project field 812 that receives an agent-specific project identifier, an editable agent-specific screener field 814 that receives an agent-specific screen identifier, an editable agent-specific password field 816 that receives an agent-specific password identifier, an editable agent-specific password confirmation field 818 that receives an agent-specific password confirmation identifier, an editable agent-specific e-mail field 820 that receives an agent-specific e-mail identifier, an editable agent-specific vendor identification field 822 that receives an agent-specific vendor identifier, an editable agent-specific location identification field 824 that receives an agent-specific location identifier, an editable agent-specific designation field 826 that receives an agent-specific designation identifier, an editable agent-specific supervisor field 828 that receives an agent-specific supervisor identifier, an editable agent-specific manager field 830 that receives an agent-specific manager identifier, and an editable agent-specific ATTUID field 832 that receives an agent-specific ATTUID identifier. In one implementation, the agent-specific manager field 830 and the editable agent-specific supervisor field 828 include selectable values based on the agent-specific location identifier.

The selectable values for the agent-specific vendor identification field 822 and the selectable values for the agent-specific location identification field 824 may be based on the global vendor identifiers and the global vendor-specific location identifiers stored in the vendor identification table 214. For example, the agent profile program 212 may query the vendor identification table 214 for a list of global vendor identifiers, and then populate the selectable values for the editable agent-specific vendor identification field 822 with the results of that query. When a global vendor identifier is selected in the editable agent-specific vendor identification field 822, the agent profile program 212 may then reference a vendor-location association to retrieve vendor-specific location identifiers from the vendor identification table 214, and provide the retrieved vendor-specific location identifiers as selectable values for the editable agent-specific location identification field 824.

The agent profile graphical user interface 802 may also include an agent-specific administrative rights control 834 that identifies whether the agent should have administrative rights for the agent feedback tool 114 and an agent-specific active control 836 that identifies whether the agent is active for the agent feedback tool 114. In one implementation, access to the agent feedback tool 114 may be limited to agents that are identified as active. In another implementation, a vendor may have access to an agent profile where the agent profile is assigned to the global vendor identifier. Hence, a vendor may be responsible for updating the agent profile information for an agent without having specific administrative rights.

When the agent-specific identifiers have been provided in the agent-specific editable fields 810-832, the agent profile program 212 may populate or update one or more entries in the agent profile table 822 with the provided agent-specific identifiers. The populated or updated entries may be associated with an agent identifier of the agent selected in the agent selection control 808. In one implementation, the agent profile program 212 populates an agent-specific vendor identification entry with the received agent-specific vendor identifier and an agent-specific location identification entry with the received agent-specific location identifier. The agent profile program 212 may populate or update other entries, such as an agent-specific manager entry, an agent-specific e-mail entry, or other entries.

The agent profile program 212 may also be operative to update or populate one or more mapping records. For example, the agent profile program 212 may update or populate an agent profile mapping record associated with the agent identifier of the agent selected in the agent selection control 808 with the provided agent-specific identifiers. Alternatively, or in addition, the agent profile program 212 may update or populate an agent feedback mapping record associated with the agent identifier of the agent selected in the agent selection control 808 with the provided agent-specific identifiers.

The agent-profile graphical user interface 802 may also include an editable search field and an editable search control 838. One or more values or identifiers may be provided to the editable search field. Manipulation of the editable search control 838 may then instruct the agent profile program 212 to search one or more tables, such as the agent profile table 22, with the values or identifies provided in the editable search field. The agent profile program 212 may provide the results of the search in one or more editable agent-specific fields 810-832 or in the agent selection control 808. The agent profile program 212 may also provide the results of the search in a separate graphical user interface.

Figure 9:
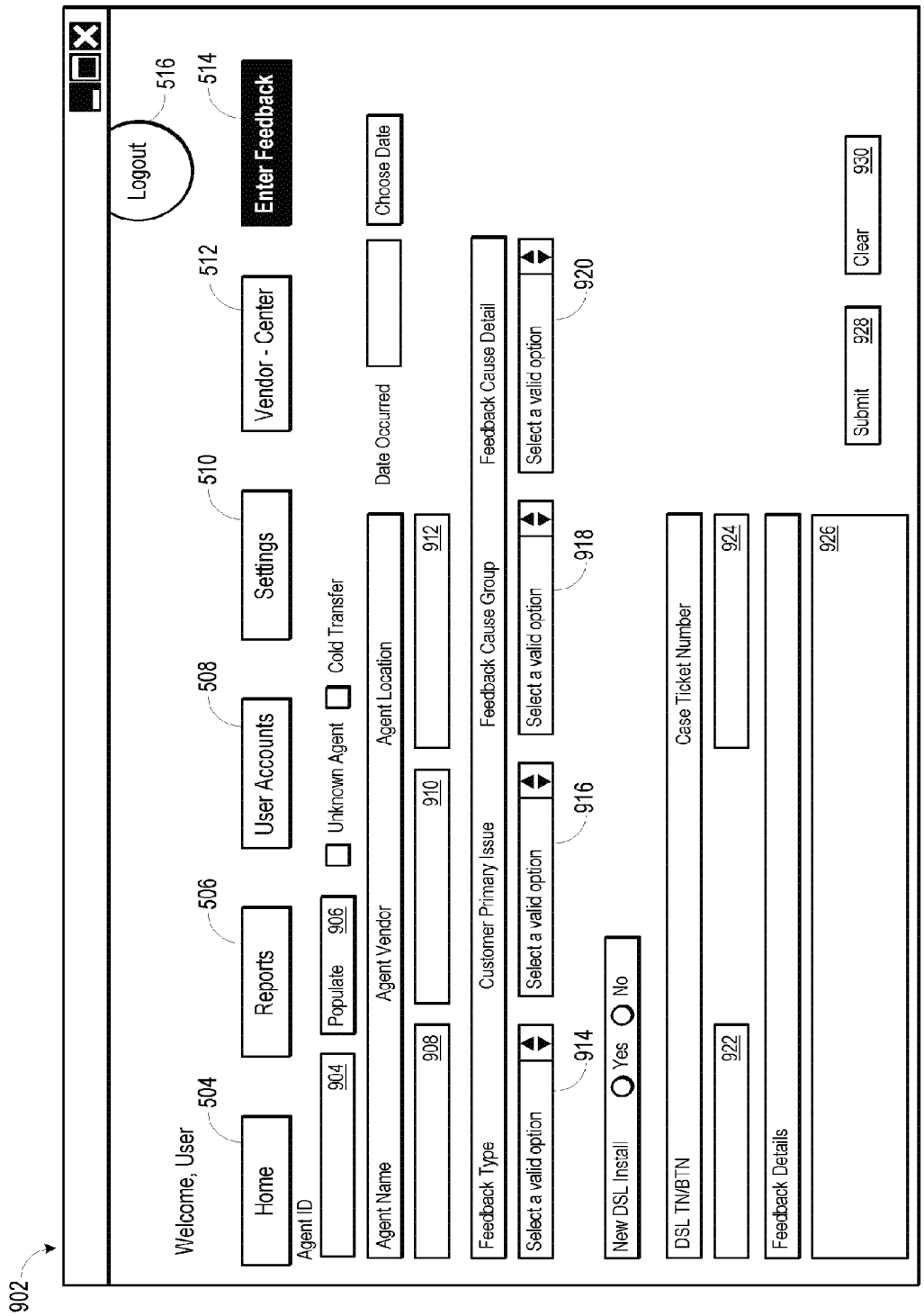
FIG. 9 shows one example of an agent feedback graphical user interface.

FIG. 9 shows one example of an agent feedback graphical user interface 902 for managing and providing feedback for an agent. The agent feedback program 206 may be operative to generate the display of the agent feedback graphical user interface 902. In one implementation, the agent feedback graphical user interface 902 includes an agent selector entry 904 that accepts an agent identifier and an autopopulation control 906 that autopopulates one or more fields of the agent feedback graphical user interface 902 based on a provided agent identifier for the agent selector entry 904. The autopopulation control 906 may be automatically manipulated by one or more programs 202-212 of the agent feedback tool 114 or may be manually manipulated by a user interacting with the agent feedback tool 114. In response to manipulation of the autopopulation control 906, the agent feedback program 206 may autopopulate one or more fields of the agent feedback graphical user interface 902, such as an agent-specific name identification field 908, an agent-specific vendor identification field 910, an agent-specific location identification field 912, or other fields.

To perform the autopopulation of the identification fields 908-912, the agent feedback program 206 references one or more mapping records. For example, the agent feedback program 206 may reference an agent feedback mapping record of the agent feedback table 220 using the provided agent identifier in the agent selector entry to retrieve the agent-specific identifier and the agent-specific location identifier. Alternatively, or in addition, the agent feedback program 206 may reference an agent profile record of the agent profile table 222 using the provided agent identifier in the agent selector entry to retrieve the agent-specific identifier and the agent-specific location identifier. As the details for an agent may be maintained across multiple tables of the agent feedback database 122, the autopopulation of the fields of the agent feedback graphical user interface 902 reduces the amount of resources required to individually populate each of the fields. Moreover, as the details of an agent may be complex and cumbersome, allowing individual population of the data into the fields of the agent feedback graphical user interface 902 may introduce data errors or the data may be incomplete. Hence, autopopulation of the fields of the agent feedback graphical user interface 902 ensures that the data populated into the fields of the agent feedback graphical user interface 902 is accurate and complete.

The agent feedback graphical user interface 902 also includes controls 914-920 for providing feedback about the agent. In one implementation, the agent feedback graphical user interface 902 includes primary agent feedback controls 914-918 and a secondary agent feedback control 920. Other feedback controls are also possible. The selectable values of the primary feedback controls 914-918 are populated using the global primary agent feedback identifiers stored in the primary agent settings table 216. As each primary agent feedback control 914-918 is associated with a global primary agent feedback category, the agent feedback program 206 may populate the selectable values of the primary agent feedback controls 914-918 using the global primary agent feedback category as a reference. In a similar fashion, the agent feedback program 206 may populate the selectable values of the secondary feedback control 920 by referring to the secondary agent settings table 218. In addition, the agent feedback program 206 may use a global primary agent feedback identifier selected using the primary agent feedback control 918 to further refine the global secondary identifiers that are available as selectable values for the secondary agent feedback control 920.

The agent feedback graphical user interface 902 further includes an editable DSL/TN identification field 922 that stores a DSL/TN identifier and an editable case identification field 924 that stores a case identifier. An editable feedback details control 926 may also be provided for identifying specific details of the feedback. Other editable fields are also possible.

The agent feedback graphical user interface 902 also includes controls 928-930 for committing or clearing the data provided in the fields of the agent feedback graphical user interface 902. For example, manipulation of the clear control 930 may the clear values or identifies present in the editable fields 904, 908-926 and may require the re-population of those fields. Manipulation of the submit control 928 may commit the identifiers or values of the editable fields 908-924 to a mapping record associated with the agent identifier in the agent selector entry 904. For example, by manipulating the submit control 928, the agent feedback program 206 may commit the selected global primary agent feedback identifiers and the selected global secondary agent feedback identifier as agent-specific feedback identifiers for the agent feedback mapping record associated with the agent identifier in the agent selector entry 904. Moreover, when the submit control 928 is manipulated, the agent feedback program 206 may add a new agent feedback mapping record to the agent feedback table 220 or may modify a previously existing agent feedback mapping record in the agent feedback table 220. In one implementation, adding a new agent feedback mapping record also generates a new a numerical feedback identifier associated with the newly added feedback mapping record.

The agent feedback program 206 may also monitor the status or dates of provided feedbacks. For example, the agent feedback program 206 may automatically modify agent feedback mapping records that have a feedback status identifier of "Pending" to "Reviewed." In one implementation, the agent feedback program 206 automatically modifies the agent feedback mapping record when a date identifier identifies that the provided feedback has reached a predetermined feedback pending time limit, such as three days. Moreover, the agent feedback program 206 may provide reminders or other alarms alerting a user that an agent feedback mapping record has reached a predetermined feedback time limit of two days. Other types of monitoring are also possible.

Figure 10:
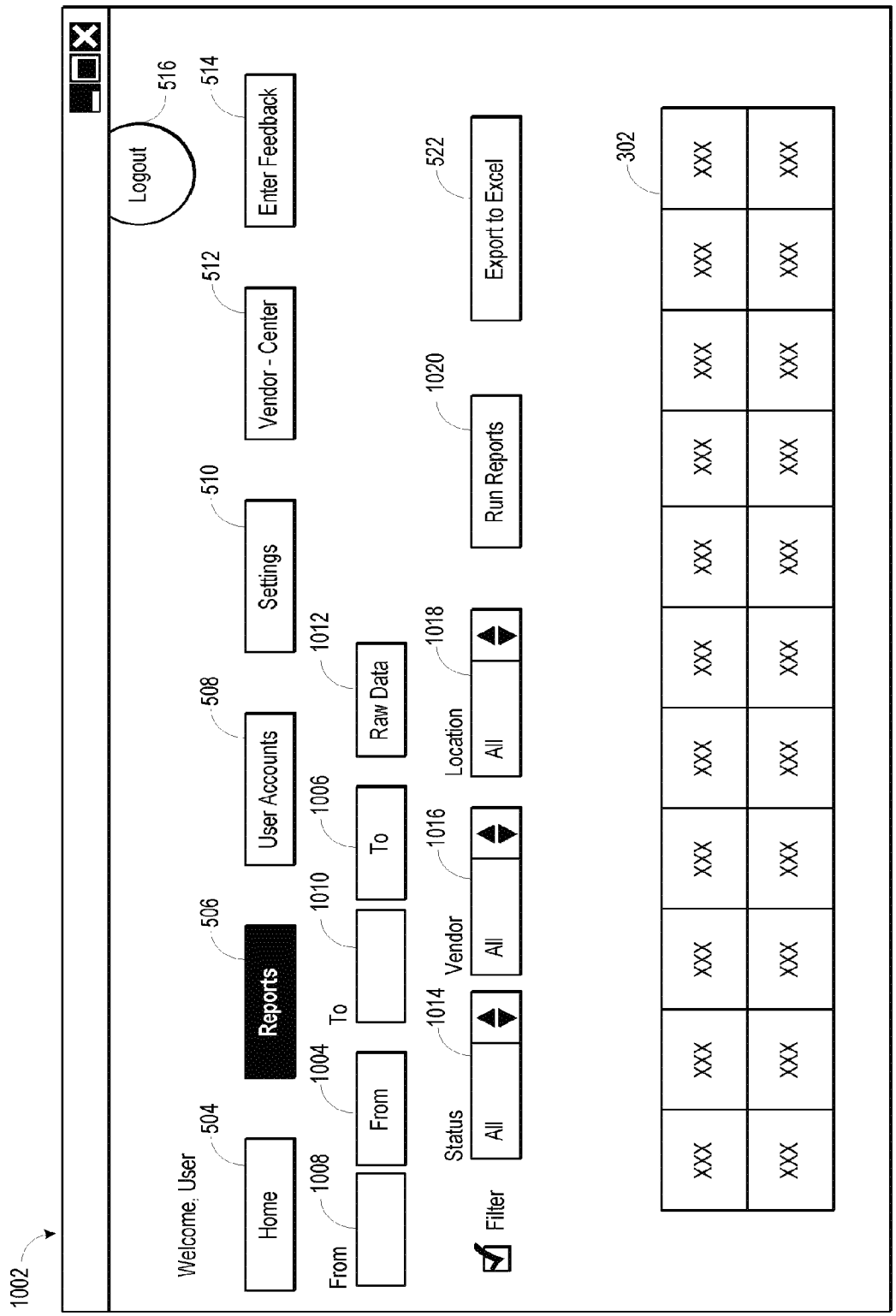
FIG. 10 shows one example of an agent reporting graphical user interface.

FIG. 10 shows one example of an agent reporting graphical user interface 1002 for generating reports of agent feedback. The agent reporting program 208 may be operative to display the agent reporting graphical user interface 1002. In one implementation, the reporting graphical user interface 1002 include date selection controls 1004-1006 for graphically selecting a starting and ending date for the reporting of feedback. The reporting graphical user interface 1002 may also include an editable starting date field 1008 that receives a starting date and an editable ending date field 1010 that receives an ending date. Manipulation of a raw data control 1012 may cause the agent reporting program 208 to retrieve agent feedback mapping records from the agent feedback table 220 whose date occurred identifiers fall within the range identified by the editable date fields. Alternatively, the agent reporting program 208 may initially retrieve agent feedback mapping records based on other data, such as an agent identifier, agent-specific primary agent feedback identifier, or other identifier. The agent reporting program 208 may then display the retrieved mapping records. FIG. 10 shows an example of displaying a retrieved agent feedback mapping record 302, where the "XXX" entries represent the individual field entries in the record 302.

After the initial retrieving of the agent feedback mapping records, the agent reporting program 208 may be configured to display select agent feedback mapping records based on filter criteria. In one implementation, the agent reporting graphical user interface 1002 includes filter controls 1014-1018 for selecting specific agent feedback mapping records to display. The filter controls 1014-1018 may include a status filter control 1014 that displays selectable values corresponding to feedback status, a vendor filter control 1016 that displays selectable values corresponding to vendor identifiers, and a location filter control 1018 that displays selectable values corresponding to vendor-specific location identifiers. Other types of filter controls, such as a location filter control, an agent identifier filter control, and a feedback numerical identifier control are also possible. The agent reporting program 208 may populate the selectable values of the filter controls 1014-1018 by referencing one or more tables, such as the agent profile table 222, the agent feedback table 220, the vendor identification table 214, or other tables.

Display of the selected agent feedback mapping records may be initiated through manipulation of a filter display control 1020. To display selected agent feedback mapping records, the agent reporting program 208 may compare one or more of the selected values of the filter controls 1014-1018 with a corresponding identifier in the displayed agent feedback mapping records. Alternatively, the agent reporting program 208 may reference one or more tables, such as the agent feedback table 220, to retrieve agent feedback mapping records whose corresponding identifiers match the selected values of the filter controls 1014-1018.

Figure 11:
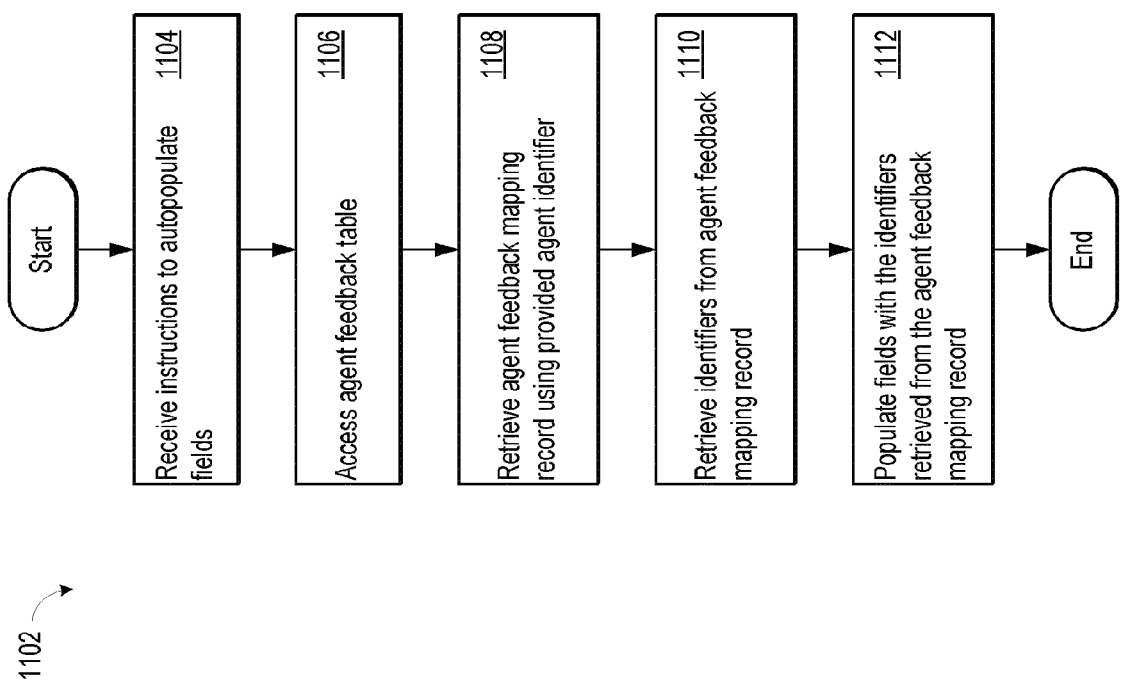
FIG. 11 shows one example of logic flow for autopopulating one or more fields of the agent feedback graphical user interface shown in FIG. 9.

FIG. 11 shows one example of logic flow 1102 for autopopulating one or more fields of the agent feedback graphical user interface 902. Although the example shown in FIG. 11 is directed to autopopulating the agent-specific name identification field 908, the agent-specific vendor identification field 910, and the agent-specific location identification field 912, other fields may be autopopulated as well.

Initially, the agent feedback program 906 receives an instruction to autopopulate the fields 908-912 using a provided agent identifier (1104). The agent feedback program 906 then accesses a table of the agent feedback database 122, such as the agent profile table 222, the agent feedback table 220, or any other table (1106). Where the agent feedback program 906 access the agent feedback table 220, the agent feedback program 906 retrieves an agent feedback mapping record that matches the provided agent identifier (1108). Using the provided agent identifier, the agent feedback program 206 references the retrieved agent feedback mapping record to retrieve an agent-specific name identifier, an agent-specific vendor identifier, and an agent-specific location identifier (1110). After retrieving the agent-specific name identifier, the agent-specific vendor identifier, and the agent specific location identifier (1110), the agent feedback program 906 populate the agent-specific name identification field 908 with the agent-specific name identifier, the agent-specific vendor identification field 910 with the agent-specific vendor identifier, and the agent-specific location identification field 912 with the agent-specific location identifier (1112).

The logic, circuitry, and processing described above may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device. The medium may be implemented as any device or tangible component that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions, or in software in an application programming interface (API) or in a Dynamic Link Library (DLL), functions available in a shared memory or defined as local or remote procedure calls, or as a combination of hardware and software executing under any desired operating system, including the Windows™, Linux, OS X™ or other operating system.

In other implementations, the logic may be represented in a signal or a propagated-signal medium. For example, the instructions that implement the logic of any given program may take the form of an electronic, magnetic, optical, electromagnetic, infrared, or other type of signal. The systems described above may receive such a signal at a communication interface, such as an optical fiber interface, antenna, or other analog or digital signal interface, recover the instructions from the signal, store them in a machine-readable memory, and/or execute them with a processor.

The systems may include additional or different logic and may be implemented in many different ways. A processor may be implemented as a controller, microprocessor, microcontroller, application specific integrated circuit (ASIC), discrete logic, or a combination of other types of circuits or logic.

Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs, instructions, or other logic may be parts of a single program, separate programs, or distributed across several memories and processors. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. An agent feedback tool for reporting agent behavior comprising:
   an agent feedback database comprising:
      an agent feedback mapping record comprising:
         an agent-specific vendor identification entry operable to store an agent-specific vendor identifier;
         an agent-specific location identification entry operable to store an agent-specific location identifier;
         an agent identification entry operable to store an agent identifier; and
         an agent-specific agent feedback entry operable to store an agent-specific agent feedback identifier;
      a global primary agent feedback category that categorically describes a primary agent feedback type; and
      a global primary agent feedback entry associated with the global primary agent feedback category operable to store a global primary agent feedback identifier;
   a memory comprising:
      an agent feedback program that, when executed, operable to:
         display an agent feedback graphical user interface comprising:
            an agent selector entry operable to accept the agent identifier;
            an agent-specific vendor identification field; and
            an agent-specific location identification field;
         reference the agent feedback mapping record to retrieve the agent-specific vendor identifier and the agent-specific location identifier;
         autopopulate the agent-specific vendor identification field with the agent-specific vendor identifier and the agent-specific location identification field with the agent-specific location identifier; and
         accept agent feedback and store a corresponding agent-specific agent feedback identifier in the agent-specific agent feedback entry;
      an agent feedback settings program that, when executed, operable to:
         generate an agent feedback settings graphical user interface compromising an editable global primary agent feedback identifier; and
         populate the global primary agent feedback entry with the global primary agent feedback identifier; and
   a processor operable to execute the agent feedback program and the agent feedback settings program.

2. The agent feedback tool of claim 1, wherein:
   the agent feedback database further comprises:
      a vendor identification mapping record comprising:
         a global vendor identification entry operable to store a global vendor identifier; and
         a vendor-specific location identification entry operable to store a vendor-specific location identifier; and
   the memory further comprises a vendor identification program that, when executed, is operable to:
      generate a vendor identification graphical user interface comprising:
         an editable global vendor identification field operable to receive the global vendor identifier; and
         an editable vendor-specific location identification field operable to receive the vendor-specific location identifier;
      populate the global vendor identification entry with the global vendor identifier;
      populate the vendor-specific location identification entry with the vendor-specific location identifier; and
      associates the global vendor identifier with the vendor-specific location identifier.

3. The agent feedback tool of claim 2, wherein:
   the agent feedback program that, when execued, is further operable to:
      access the vendor identification mapping record;
      retrieve the global vendor identifier from the global vendor identification entry;
      provide the global vendor identifier as a selectable value for the agent-specific vendor identification field; and
      when the global vendor identifier is selected:
         reference the vendor-location association to retrieve the vendor-specific location identifier from the vendor-specific location identification entry; and
         provide the vendor-specific location identifier as a selectable value for the editable agent-specific location identification field.

4. The agent feedback tool of claim 1, wherein:
   the agent-specific agent feedback entry comprises:
      an agent-specific primary agent feedback entry operable to store an agent-specific primary agent feedback identifier;
   the agent feedback graphical user interface further comprises:
      an agent-specific primary feedback field operable to receive the agent-specific primary agent feedback identifier;
   the agent feedback program that, when executed, is further operable to:
      retrieve the global primary agent feedback identifier from the global primary agent feedback entry; and
      provide the global primary agent feedback identifier as a selectable value for the agent-specific primary agent feedback entry.

5. The agent feedback tool of claim 4, wherein:
   the agent feedback database further comprises:
      a global secondary agent feedback category that categorically describes a secondary agent feedback type; and
      a global secondary agent feedback entry associated with the global secondary agent feedback category operable to store a global secondary agent feedback identifier;
   the agent feedback settings graphical user interface further comprises:
      an editable global secondary agent field operative to receive the global secondary agent feedback identifier; and
   the agent feedback settings program that, when executed, is further operable to:

populate the global secondary agent feedback entry with the global secondary agent feedback identifier; and
associate the global secondary agent feedback identifier with the global primary agent feedback identifier.

6. The agent feedback tool of claim 5, wherein:
the agent feedback graphical user interface further comprises:
an agent-specific secondary feedback field operable to receive the agent-specific secondary agent feedback identifier;
the agent feedback program that, when executed, is further operable to:
retrieve the global secondary agent feedback identifier from the global secondary agent feedback entry; and
provide the global secondary agent feedback identifier as a selectable value for the global agent-specific secondary agent feedback field.

7. An agent feedback method for reporting agent behavior comprising:
implementing an agent feedback mapping record in a computer-readable medium, the agent feedback mapping record comprising:
an agent-specific vendor identification entry operable to store an agent-specific vendor identifier;
an agent-specific location identification entry operable to store an agent-specific location identifier;
an agent identification entry operable to store an agent identifier; and
an agent-specific agent feedback entry operable to store an agent-specific agent feedback identifier;
establishing, in the computer-readable medium, a global primary agent feedback entry associated with a global primary agent feedback category, wherein:
the global primary agent feedback entry is operative to store a global primary agent feedback identifier, and
the global primary agent feedback category that categorically describes a primary agent feedback type;
displaying, on a display, an agent profile graphical user interface comprising:
an editable agent-specific vendor identification field operable to receive the agent-specific vendor identifier; and
an editable agent-specific location identification field operable to receive the agent-specific location identifier;
displaying on the display an agent selector entry operable to accept the agent identifier;
displaying on the display an agent-specific vendor identification field;
displaying on the display an agent-specific location identification field;
referencing the agent feedback mapping record to retrieve the agent-specific vendor identifier and the agent-specific location identifier;
autopopulating using a processor the agent-specific vendor identification field with the agent-specific vendor identifier and the agent-specific location identification field with the agent-specific location identifier;
accepting agent feedback and storing a corresponding agent-specific agent feedback identifier in the agent-specific agent feedback entry;
displaying, on the display, an agent feedback settings graphical user interface comprising an editable global primary agent feedback field operable to receive the global primary agent feedback identifier; and
populating the global primary agent feedback entry with the global primary agent feedback identifier.

8. The agent feedback method of claim 7, further comprising:
implementing a vendor identification mapping record in the computer-readable medium, wherein the vendor identification mapping record comprises:
a global vendor identification entry operable to store a global vendor identifier; and
a vendor-specific location identification entry operable to store a vendor-specific location identifier;
displaying, on a display, a vendor identification graphical user interface comprising:
an editable global vendor identification field operable to receive the global vendor identifier; and
an editable vendor-specific location identification field operable to receive the vendor-specific location identifier;
populating the global vendor identification entry with the global vendor identifier;
populating the vendor-specific location identification entry with the vendor-specific location identifier; and
associating the global vendor identifier with the vendor-specific location identifier.

9. The agent feedback method of claim 8, further comprising:
accessing the vendor identification mapping record;
retrieving the global vendor identifier from the global vendor identification entry;
providing the global vendor identifier as a selectable value for the agent-specific vendor identification field; and
when the global vendor identifier is selected:
referencing the vendor-location association to retrieve the vendor-specific location identifier from the vendor-specific location identification entry; and
providing the vendor-specific location identifier as a selectable value for the editable agent-specific location identification field.

10. The agent feedback method of claim 7, wherein:
the agent-specific agent feedback entry comprises:
an agent-specific primary agent feedback entry operative to store an agent-specific primary agent feedback identifier; and
further comprising:
displaying, on the display, an agent-specific primary feedback field operative to receive the agent-specific primary agent feedback identifier;
retrieving the global primary agent feedback identifier from the global primary agent feedback entry; and
providing the global primary agent feedback identifier as a selectable value for the agent-specific primary agent feedback entry.

11. The agent feedback method of claim 10, further comprising:
establishing, in the computer-readable medium, a global secondary agent feedback entry associated with a global secondary agent feedback category, wherein:
the global secondary primary agent feedback entry is operative to store a global secondary agent feedback identifier; and
the global secondary agent feedback category categorically describes a secondary agent feedback type;
displaying, on the display, an editable global secondary agent field operative to receive the global secondary agent feedback identifier;
populating the global secondary agent feedback entry with the global secondary agent feedback identifier; and associating the global secondary agent feedback identifier with the global primary agent feedback identifier.

12. The agent feedback method of claim 11, further comprising:
displaying, on the display, an agent-specific secondary feedback field operative to receive the agent-specific secondary agent feedback identifier;
retrieving the global secondary agent feedback identifier from the global secondary agent feedback entry; and
providing the global secondary agent feedback identifier as a selectable value for the global agent-specific secondary agent feedback field.

13. An article of manufacture comprising:
a non-transitory computer-readable storage media; and
computer-executable instructions stored on the non-transitory computer-readable storage media and operable to
implement an agent feedback mapping record in the non-transitory computer-readable storage media, the agent feedback mapping record comprising:
an agent-specific vendor identification entry operable to store an agent-specific vendor identifier;
an agent-specific location identification entry operable to store an agent-specific location identifier;
an agent identification entry operable to store an agent identifier; and
an agent-specific agent feedback entry operable to store an agent-specific agent feedback identifier;
establish, in the non-transitory computer-readable storage media, a global primary agent feedback entry associated with a global primary agent feedback category, wherein:
the global primary agent feedback entry is operative to store a global primary agent feedback identifier; and
the global primary agent feedback category that categorically describes a primary agent feedback type;
display, on a display, an agent profile graphical user interface comprising:
an editable agent-specific vendor identification field operable to receive the agent-specific vendor identifier; and
an editable agent-specific location identification field operable to receive the agent-specific location identifier;
display on the display an agent selector entry operable to accept the agent identifier;
display on the display an agent-specific vendor identification field;
display on the display an agent-specific location identification field;
reference the agent feedback mapping record to retrieve the agent-specific vendor identifier and the agent-specific location identifier;
autopopulate the agent-specific vendor identification field with the agent-specific vendor identifier and the agent-specific location identification field with the agent-specific location identifier;
accept agent feedback and storing a corresponding agent-specific agent feedback identifier in the agent-specific agent feedback entry;
display,on the display, an agent feedback settings graphical user interface comprising an editable global primary agent feedback field operable to receive the gobal primary agent feedback identifier, and
populate a global primary agent feedback entry with the global primary agent feedback identifier.

14. The non-transitory computer-readable storage media of claim 13, wherein the instructions are further operable to:
implement a vendor identification mapping record in the non-transitory computer-readable storage media, wherein the vendor identification mapping record comprises:
a global vendor identification entry operable to store a global vendor identifier; and
a vendor-specific location identification entry operable to store a vendor-specific location identifier;
display, on the display, a vendor identification graphical user interface comprising:
an editable global vendor identification field operable to receive the global vendor identifier; and
an editable vendor-specific location identification field operable to receive the vendor-specific location identifier;
populate the global vendor identification entry with the global vendor identifier;
populate the vendor-specific location identification entry with the vendor-specific location identifier; and
associate the global vendor identifier with the vendor-specific location identifier.

15. The non-transitory computer-readable storage media of claim 14, wherein the instructions are further operable to:
access the vendor identification mapping record;
retrieve the global vendor identifier from the global vendor identification entry;
provide the global vendor identifier as a selectable value for the agent-specific vendor identification field; and
when the global vendor identifier is selected:
reference the vendor-location association to retrieve the vendor-specific location identifier from the vendor-specific location identification entry; and
provide the vendor-specific location identifier as a selectable value for the editable agent-specific location identification field.

16. The non-transitory computer-readable storage media of claim 13, wherein:
the agent-specific agent feedback entry comprises:
an agent-specific primary agent feedback entry operative to store an agent-specific primary agent feedback identifier; and
the instructions are further operable to:
display, on the display, an agent-specific primary feedback field operative to receive the agent-specific primary agent feedback identifier;
retrieve the global primary agent feedback identifier from the global primary agent feedback entry; and
provide the global primary agent feedback identifier as a selectable value for the agent-specific primary agent feedback entry.

17. The non-transitory computer-readable storage media of claim 16, wherein the instructions are further operable to:
establish, in the computer-readable storage media, a global secondary agent feedback entry associated with a global secondary agent feedback category, wherein:
the global secondary primary agent feedback entry is operative to store a global secondary agent feedback identifier; and
the global secondary agent feedback category categorically describes a secondary agent feedback type;
display, on the display, an editable global secondary agent field operative to receive the global secondary agent feedback identifier;
populate the global secondary agent feedback entry with the global secondary agent feedback identifier;

associate the global secondary agent feedback identifier with the global primary agent feedback identifier;
display, on the display, an agent-specific secondary feedback field operative to receive the agent-specific secondary agent feedback identifier;
retrieve the global secondary agent feedback identifier from the global secondary agent feedback entry; and
provide the global secondary agent feedback identifier as a selectable value for the global agent-specific secondary agent feedback field.

18. The agent feedback tool of claim 1, wherein the memory further comprises:
an agent profile program that, when executed, is operable to:
generate an agent profile graphical user interface comprising:
an editable agent-specific vendor identification field operable to receive the agent-specific vendor identifier; and
an editable agent-specific location identification field operable to receive the agent-specific location identifier;
populate the agent-specific vendor identification entry with the agent-specific vendor identifier; and
populate the agent-specific location identification entry with the agent-specific location identifier.

19. An article of manufacture comprising:
a non transitory computer-readable storage media; and
computer-executable instructions stored on the media and operable to:
implement an agent feedback mapping record comprising:
an agent-specific vendor identifier;
an agent-specific location identifier;
an agent identifier; and
an agent-specific agent feedback entry operable to store an agent-specific agent feedback identifier;
establish, in the computer-readable medium:
a global primary agent feedback entry operative to store a global primary agent feedback identifier; and
a global primary agent feedback category associated with the global primary agent feedback entry and that describes a primary agent feedback type;
display, on a display:
an agent profile graphical user interface comprising:
an editable agent-specific vendor identification field operable to receive the agent-specific vendor identifier; and
an editable agent-specific location identification field operable to receive the agent-specific location identifier;
an agent-specific vendor identification field; and
an agent-specific location identification field;
reference the agent feedback mapping record to retrieve the agent-specific vendor identifier and the agent-specific location identifier;
autopopulate the agent-specific vendor identification field with the agent-specific vendor identifier and the agent-specific location identification field with the agent-specific location identifier;
display, on the display, an agent feedback settings graphical user interface comprising an editable global primary agent feedback field operable to receive the global primary agent feedback identifier;
populate the global primary agent feedback entry with the global primary agent feedback identifier; and
accept agent feedback and store a corresponding agent-specific agent feedback identifier in the agent-specific agent feedback entry.

* * * * *